United States Patent
Lin et al.

(10) Patent No.: US 12,542,490 B2
(45) Date of Patent: Feb. 3, 2026

(54) POWER SUPPLY SYSTEM HAVING AUXILIARY WINDING AND BLOCKING MODULE

(71) Applicant: Chicony Power Technology Co., Ltd., New Taipei (TW)

(72) Inventors: Chen-Chi Lin, New Taipei (TW); Sheng-Yu Hsu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 342 days.

(21) Appl. No.: 18/122,375

(22) Filed: Mar. 16, 2023

(65) Prior Publication Data

US 2024/0186905 A1 Jun. 6, 2024

(30) Foreign Application Priority Data

Dec. 6, 2022 (TW) .................................. 111146829

(51) Int. Cl.
*H02M 3/335* (2006.01)
*H02M 1/00* (2006.01)

(52) U.S. Cl.
CPC ..... *H02M 3/33523* (2013.01); *H02M 1/0006* (2021.05); *H02M 1/0025* (2021.05)

(58) Field of Classification Search
CPC ............. H02M 1/0006; H02M 1/0025; H02M 3/33523

See application file for complete search history.

(56) References Cited

U.S. PATENT DOCUMENTS

| | | | |
|---|---|---|---|
| 8,533,508 B2 | 9/2013 | Chang et al. | |
| 8,654,113 B2 | 2/2014 | Lin et al. | |
| 9,627,922 B2 | 4/2017 | Lee | |
| 11,159,088 B2 | 10/2021 | Naji et al. | |
| 2004/0021992 A1 | 2/2004 | Takamatsu | |
| 2014/0239829 A1* | 8/2014 | Zhang | H02M 3/335 315/200 R |

(Continued)

FOREIGN PATENT DOCUMENTS

| | | |
|---|---|---|
| CN | 111313729 | 6/2020 |
| TW | 200541192 | 12/2005 |

(Continued)

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

A power supply system includes a primary side circuit, a secondary side circuit, an auxiliary winding, a blocking module, a control module, and a controller. The auxiliary winding is magnetically coupled to the secondary side winding and includes a first sub winding and a second sub winding in series. The auxiliary winding has a first tap at the dotted end of the first sub winding, a second tap at the dotted end of the second sub winding, and a ground tap coupling the second sub winding to the ground. The blocking module receives a first auxiliary voltage and a second auxiliary voltage and outputs a selected voltage. The control module controls the blocking module according to the second auxiliary voltage to output the first auxiliary voltage or the second auxiliary voltage as the selected voltage. The controller is electrically coupled to the blocking module and the control module.

20 Claims, 13 Drawing Sheets

(56) References Cited

U.S. PATENT DOCUMENTS

| | | | | |
|---|---|---|---|---|
| 2018/0294668 A1* | 10/2018 | Li | ............................ | H02J 9/005 |
| 2021/0184584 A1* | 6/2021 | Wang | ................... | H02M 1/0006 |
| 2024/0072674 A1* | 2/2024 | Saliva | ..................... | H02M 3/01 |
| 2024/0128875 A1* | 4/2024 | Bonavente | ........... | H02M 1/0009 |

FOREIGN PATENT DOCUMENTS

| | | |
|---|---|---|
| TW | 200617631 | 6/2006 |
| TW | M491298 | 12/2014 |
| TW | I664875 | 7/2019 |

\* cited by examiner

100

100

POWER SUPPLY SYSTEM HAVING AUXILIARY WINDING AND BLOCKING MODULE

CROSS-REFERENCE TO RELATED APPLICATION

This non-provisional application claims priority under 35 U.S.C. § 119(a) to Patent Application No. 111146829 filed in Taiwan, R.O.C. on Dec. 6, 2022, the entire contents of which are hereby incorporated by reference.

BACKGROUND

Technical Field

The instant disclosure is related to a power supply system, especially a power supply system in which the voltage of the system mapped to the auxiliary circuit is adjustable.

Related Art

In general, in a flyback converter known to the inventor, the power supply voltage of a transistor driver is provided by the voltage mapped from the secondary side coil to the auxiliary coil. The supported voltage range of USB PD2.0 and USB PD3.0 is from 5 V to 20 V. In order to obtain sufficient power supply voltage for the driver under the condition of the lowest 5V output voltage, the turn ratio of the secondary side coil to the auxiliary coil cannot be too low. For example, if the power supply voltage required by the driver is 20 V, the turn ratio of the secondary side coil to the auxiliary coil is 1:4. Under this turn ratio condition, when the output voltage at the secondary side is increased to 20 V, the voltage mapped to the auxiliary winding will be 80 V. As a result, this voltage is usually lowered by a regulator (such as a low dropout regulator, LDO) and then supplied to the driver.

However, the supported voltage range of USB PD3.1 is expanded to at most 48 V compared with the supported voltage range of USB PD3.0, and therefore the voltage mapped to the auxiliary coil will also change within a wide range depending on the output voltage at the secondary side. Take the foregoing example. When the output voltage at the secondary side is increased to 48 V, the voltage mapped to the auxiliary coil will be 192 V. In this example, if an LDO is used to directly lower this voltage (for example, the output voltage of the LDO is 20 V), the internal withstand voltage of the LDO will be 172 V, and therefore the power consumption will be large.

SUMMARY

In order to lower the power consumption of the regulator due to the wide output voltage, one or some embodiments of the instant disclosure provide a power supply system based on multiple auxiliary coils combined with switches and a detection mechanism. The power supply system is able to switch the power supply loop of the auxiliary circuit to the low winding coil when the output voltage at the secondary side is higher, so that the voltage mapped from the secondary side to the auxiliary circuit is lowered and therefore the voltage across the regulator is lowered so as to effectively reduce waste heat and energy consumption.

In some embodiments, the power supply system comprises a primary side circuit, a secondary side circuit, an auxiliary winding, a blocking module, a control module, and a controller. The primary side circuit comprises a primary side winding. The secondary side circuit comprises a secondary side winding. The primary side winding and the secondary side winding are magnetically coupled to each other. The secondary side winding outputs an output voltage.

In some embodiments, the auxiliary winding is magnetically coupled to the secondary side winding. The auxiliary winding comprises a first sub winding and a second sub winding which are connected to each other in series. The auxiliary winding has a first tap, a second tap, and a ground tap. The first tap is provided at a dotted end of the first sub winding. The second tap is provided at a dotted end of the second sub winding. The ground tap electrically couples a non-dotted end of the second sub winding to a ground electric potential. The secondary side winding maps the output voltage to the auxiliary winding so as to allow the first tap to generate a first auxiliary voltage and the second tap to generate a second auxiliary voltage.

In some embodiments, the blocking module is electrically coupled to the first tap and the second tap. The blocking module receives the first auxiliary voltage and the second auxiliary voltage. The blocking module outputs one of the first auxiliary voltage and the second auxiliary voltage as a selected voltage.

In some embodiments, the control module is electrically coupled to the second tap and the blocking module. The control module receives the second auxiliary voltage. The control module controls the blocking module to output the first auxiliary voltage or the second auxiliary voltage as the selected voltage according to an amplitude of the second auxiliary voltage.

In some embodiments, the controller is electrically coupled to the blocking module and the control module.

As above, in the auxiliary circuit according to one or some embodiments of the instant disclosure, the multiple auxiliary coils combined with switches and the detection mechanism can automatically adjust the voltage across the regulator in response to the wide voltage output range and therefore reduce waste heat and energy consumption.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
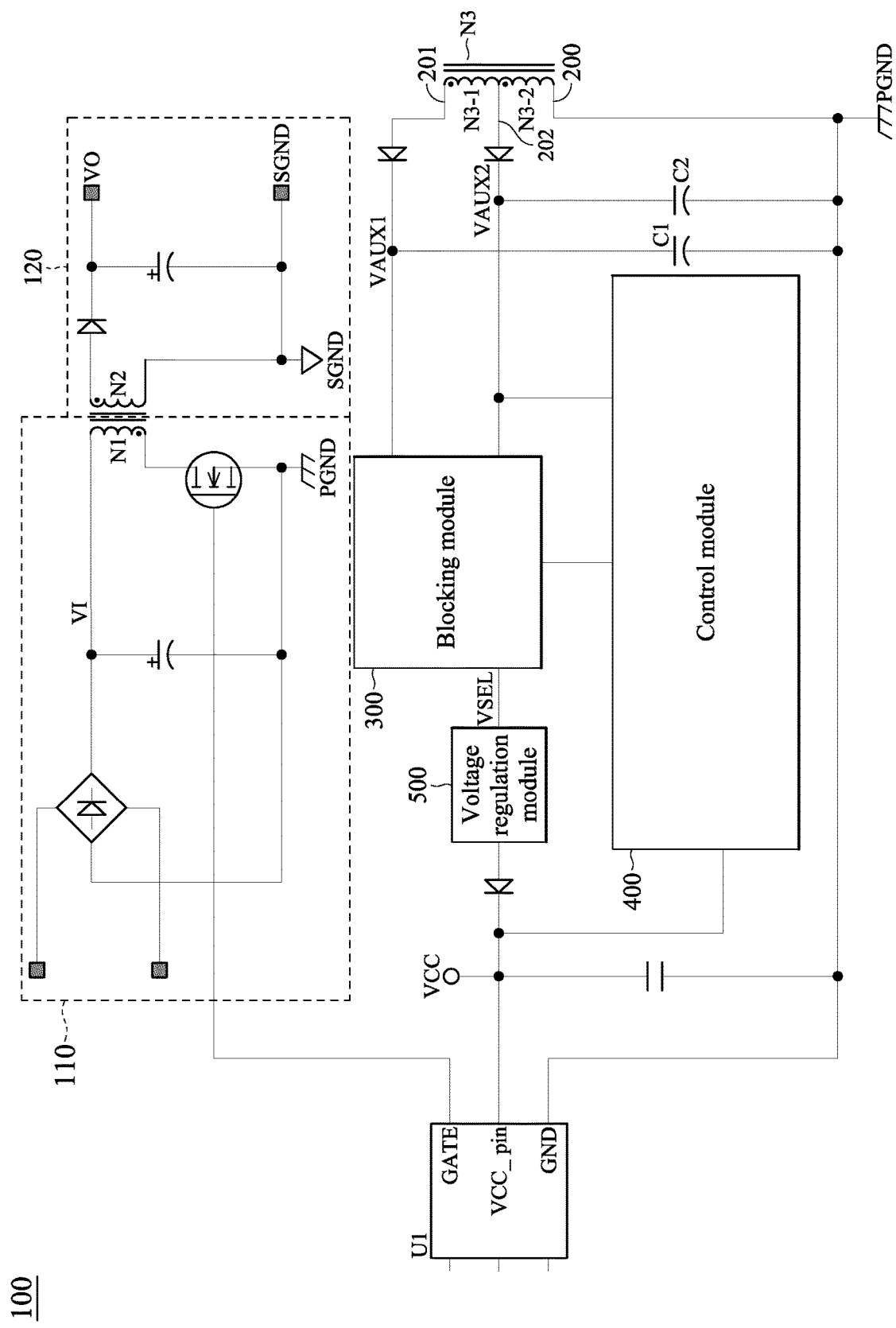
FIG. 1 illustrates a schematic circuit diagram (I) of a power supply system according to a first embodiment of the instant disclosure.

The foregoing and other technical contents, features, and effects of the instant disclosure can be clearly presented below in detailed description with reference to embodiments of the accompanying drawings. Thicknesses or sizes of the elements in the drawings illustrated in an exaggerated, omitted, or general manner are used to help a person skilled in the art with comprehension and reading, and the sizes of the elements are not completely the actual sizes and are not intended to limit any restraint conditions under which the instant disclosure can be implemented and therefore have no technical significance. Any modification to the structures, change to the proportional relationships, or adjustment on the sizes without affecting the effects and objectives that can be achieved according to the instant disclosure should fall within the scope of the technical content disclosed by the instant disclosure. In all drawings, identical symbols are used to denote identical or similar elements.

FIG. 1 illustrates a schematic circuit diagram (I) of a power supply system 100 according to a first embodiment of the instant disclosure. Please refer to FIG. 1. The power supply system 100 comprises a primary side circuit 110, a secondary side circuit 120, an auxiliary winding N3, a blocking module 300, a control module 400, a voltage regulation module 500, and a controller U1. The primary side circuit 110 comprises a primary side winding N1. The secondary side circuit 120 comprises a secondary side winding N2. The primary side winding N1 and the secondary side winding N2 are magnetically coupled to each other. The secondary side winding N2 outputs an output voltage VO according to an input voltage VI. The primary side winding N1, the secondary side winding N2, and the auxiliary winding N3 may together be referred to as a transformer. The auxiliary winding N3 is magnetically coupled to the secondary side winding N2. The auxiliary winding N3 comprises a first sub winding N3-1 and a second sub winding N3-2 which are connected to each other in series. The auxiliary winding N3 has a first tap 201, a second tap 202, and a ground tap 200. The first tap 201 is provided at a dotted end of the first sub winding N3-1. The second tap 202 is provided at the dotted end of the second sub winding N3-2. The ground tap 200 electrically couples a non-dotted end of the second sub winding N3-2 to a ground electric potential PGND. The secondary side winding N2 maps the output voltage VO to the auxiliary winding N3 so as to allow the first tap 201 to generate a first auxiliary voltage VAUX1 and the second tap 202 to generate a second auxiliary voltage VAUX2. The blocking module 300 is electrically coupled to the first tap 201 and the second tap 202. The blocking module 300 receives the first auxiliary voltage VAUX1 and the second auxiliary voltage VAUX2, and the blocking module 300 outputs one of the first auxiliary voltage VAUX1 and the second auxiliary voltage VAUX2 as a selected voltage VSEL. The control module 400 is electrically coupled to the second tap 202 and the blocking module 300. The control module 400 receives the second auxiliary voltage VAUX2, and the control module 400 controls the blocking module 300 to output the first auxiliary voltage VAUX1 or the second auxiliary voltage VAUX2 as the selected voltage VSEL according to an amplitude of the second auxiliary voltage VAUX2. A power pin VCC_pin of the controller U1 is electrically coupled to the blocking module 300 and the control module 400. An output pin GATE of the controller U1 is electrically coupled to a control end (gate) of a switching element of the primary side circuit 110. A ground pin GND of the controller U1 is grounded. The voltage regulation module 500 is electrically coupled between the controller U1 and the blocking module 300 so as to regulate the selected voltage VSEL outputted by the blocking module 300 to supply a voltage required by the controller U1.

Figure 2:
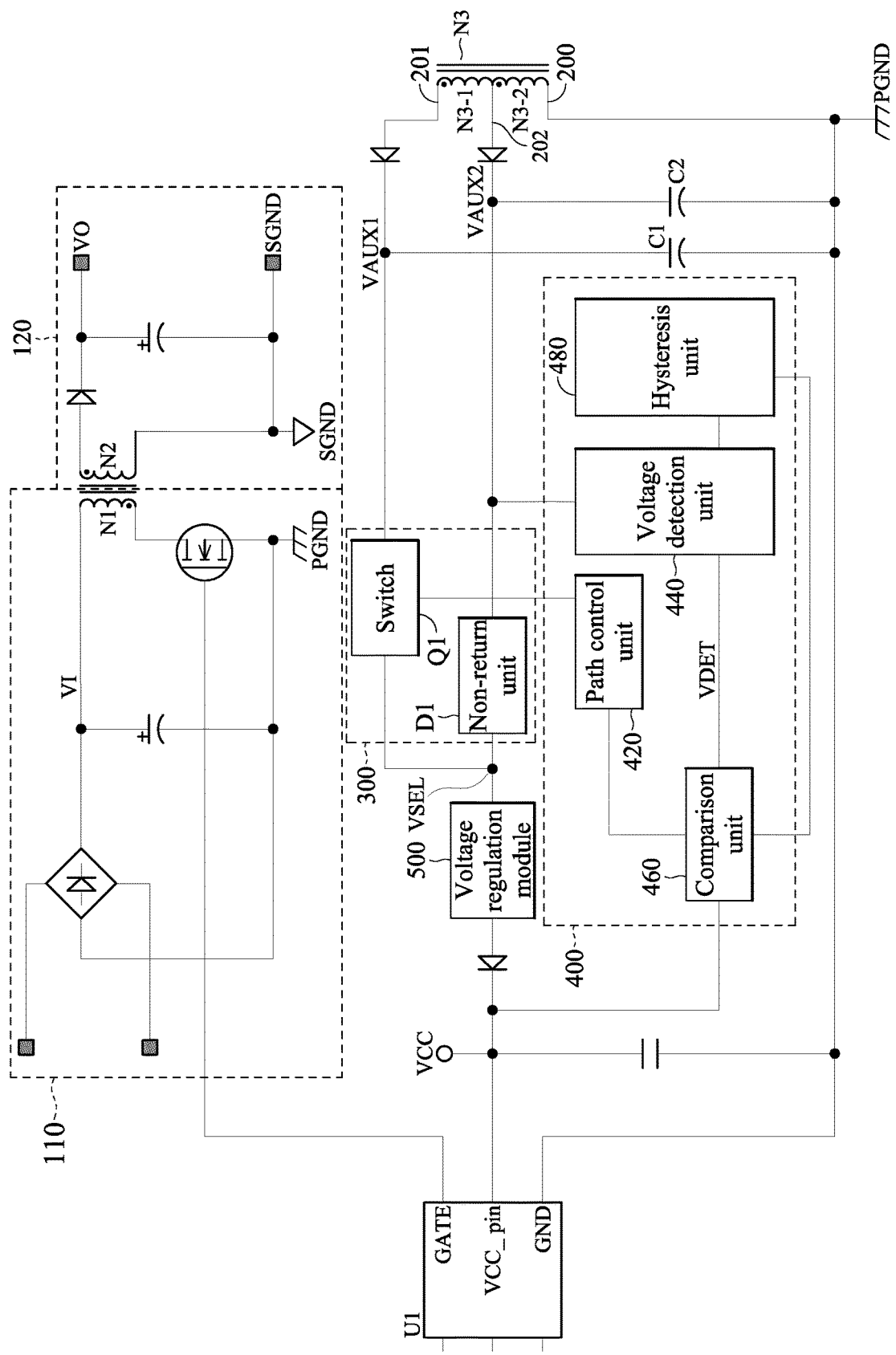
FIG. 2 illustrates a schematic circuit diagram (II) of the power supply system according to the first embodiment of the instant disclosure.

FIG. 2 illustrates a schematic circuit diagram (II) of the power supply system 100 according to the first embodiment of the instant disclosure. Please refer to FIG. 1 and FIG. 2. The blocking module 300 comprises a switch Q1 and a non-return unit D1. The switch Q1 is electrically coupled to the first tap 201, and the non-return unit D1 is electrically coupled to the second tap 202. In some embodiments, the control module 400 comprises a path control unit 420, a voltage detection unit 440, a comparison unit 460, and a hysteresis unit 480. The path control unit 420 is electrically coupled to the switch Q1. The voltage detection unit 440 is electrically coupled to the second tap 202, and the voltage detection unit 440 receives the second auxiliary voltage VAUX2 to output a detected voltage VDET to the comparison unit 460. The comparison unit 460 is electrically coupled to the path control unit 420 and the voltage detection unit 440. The comparison unit 460 receives the detected voltage VDET and generates a comparison result according to the detected voltage VDET. The path control unit 420 turns on or turns off the switch Q1 according to the comparison result. When the switch Q1 is turned on, the blocking module 300 outputs the first auxiliary voltage VAUX1 as the selected voltage VSEL. When the switch Q1 is turned off, the blocking module 300 outputs the second auxiliary voltage VAUX2 as the selected voltage VSEL. The hysteresis unit 480 is electrically coupled between the voltage detection unit 440 and the comparison unit 460, and the function of the hysteresis unit 480 will be illustrated later.

Figure 3:
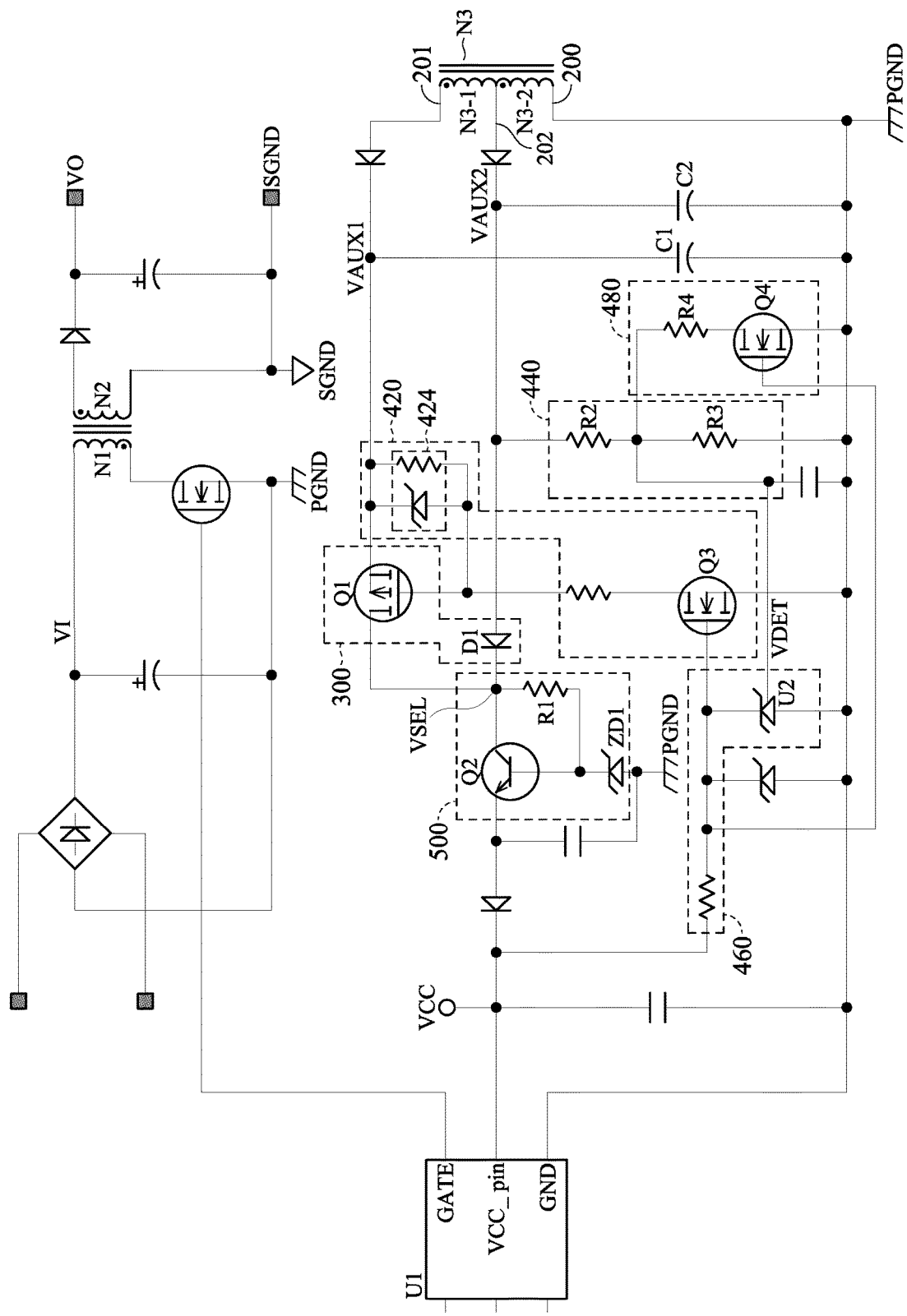
FIG. 3 illustrates a schematic circuit diagram (III) of the power supply system according to the first embodiment of the instant disclosure.

FIG. 3 illustrates a schematic circuit diagram (III) of the power supply system 100 according to the first embodiment of the instant disclosure. Please refer to FIG. 1 through FIG. 3. The voltage detection unit 440 comprises a top resistor R2 and a bottom resistor R3. One of two ends of the top resistor R2 and one of two ends of the bottom resistor R3 (i.e., the node between the top resistor R2 and the bottom resistor R3) are coupled to the comparison unit 460. The other end of the top resistor R2 is electrically coupled to the second tap 202 to receive the second auxiliary voltage VAUX2. The other end of the bottom resistor R3 is electrically coupled to the ground electric potential PGND. In this embodiment, the detected voltage VDET is a divided voltage according to the top resistor R2 and the bottom resistor R3. The hysteresis unit 480 is connected to the bottom resistor R3 in parallel. The hysteresis unit 480 comprises a hysteresis resistor R4 and a hysteresis switch Q4. The hysteresis resistor R4 is connected to the hysteresis switch Q4 in series. Consequently, in this embodiment, when the hysteresis switch Q4 is turned on, the bottom resistor R3 and the hysteresis resistor R4 are connected to each other in parallel and thus form an equivalent resistor, and the detected voltage VDET is a divided voltage (referred to as a first divided voltage hereinafter) according to the top resistor R2 and the equivalent resistor. When the hysteresis switch Q4 is turned off, the detected voltage VDET is a divided voltage (referred to as a second divided voltage hereinafter) according to the top resistor R2 and the bottom resistor R3. In other words, in this embodiment, by turning on or off the hysteresis switch Q4, the value of the detected voltage VDET can be changed to the first divided voltage or the second divided voltage. Because the resistance of the equivalent resistor of the bottom resistor R3 and the hysteresis resistor R4 connected in parallel is smaller than the resistance of the bottom resistor R3, the first divided voltage is less than the second divided voltage. The hysteresis unit 480 is used to keep the switch Q1 from being frequently switched, wherein the frequent switching may be due to that the voltage that is detected (the second auxiliary voltage VAUX2 in this embodiment) may bounce near a voltage threshold (i.e., an upper hysteresis voltage or a lower hysteresis voltage, which will be illustrated later), and the bouncing can affect determination of the comparison unit 460.

Please continue to refer to FIG. 1 through FIG. 3. The path control unit 420 comprises a control switch Q3. The comparison unit 460 comprises a voltage regulator U2. The control switch Q3 is electrically coupled to a control end of the switch Q1. A first end of the voltage regulator U2 is electrically coupled to the voltage detection unit 440 so as to receive the detected voltage VDET, and a second end of the voltage regulator U2 is electrically coupled to a control end of the control switch Q3. In some embodiments, the voltage regulator U2 is a TL431 voltage regulator integrated circuit, but other types of voltage regulators may also be used, and therefore the instant disclosure is not limited thereto. The TL431 voltage regulator integrated circuit is a three-terminal bipolar transistor, and the three ends of the TL431 voltage regulator integrated circuit are referred to as reference (R), cathode (C), and anode (A), respectively. In this embodiment, the voltage regulator U2 serves as a comparison unit. When a voltage received by the reference of the voltage regulator U2 is less than a reference voltage internal to the voltage regulator U2, the path between the anode and cathode of the voltage regulator U2 is opened (referred to as "the voltage regulator U2 is opened" hereinafter). When the voltage received by the reference of the voltage regulator U2 is greater than the reference voltage internal to the voltage regulator U2, the path between the anode and cathode of the voltage regulator U2 is shorted (referred to as "the voltage regulator U2 is shorted" hereinafter).

As shown in FIG. 3, the voltage regulation module 500 comprises a regulation switch Q2, a regulation element ZD1, and a regulation resistor R1. The regulation switch Q2 is coupled to the regulation element ZD1 in series, and the regulation switch Q2 is coupled to the regulation resistor R1 in parallel. One of two ends of the regulation resistor R1 is coupled to the blocking module 300, and the other end of the regulation resistor R1 is coupled to the regulation element ZD1 and the control end of the regulation switch Q2. The regulation element ZD1 receives the selected voltage VSEL through the regulation resistor R1 to provide a stable voltage.

As shown in FIG. 3, the path control unit 420 further comprises a regulation element 424. The regulation element 424 is connected between a gate (G) and a source (S) of the switch Q1 so as to regulate a voltage between the gate and the source of the switch Q1. The regulation element 424 may for example comprise a Zener diode and thus utilize the regulation property of the Zener diode to maintain a bias of the switch Q1 within a controlled range.

Figure 4:
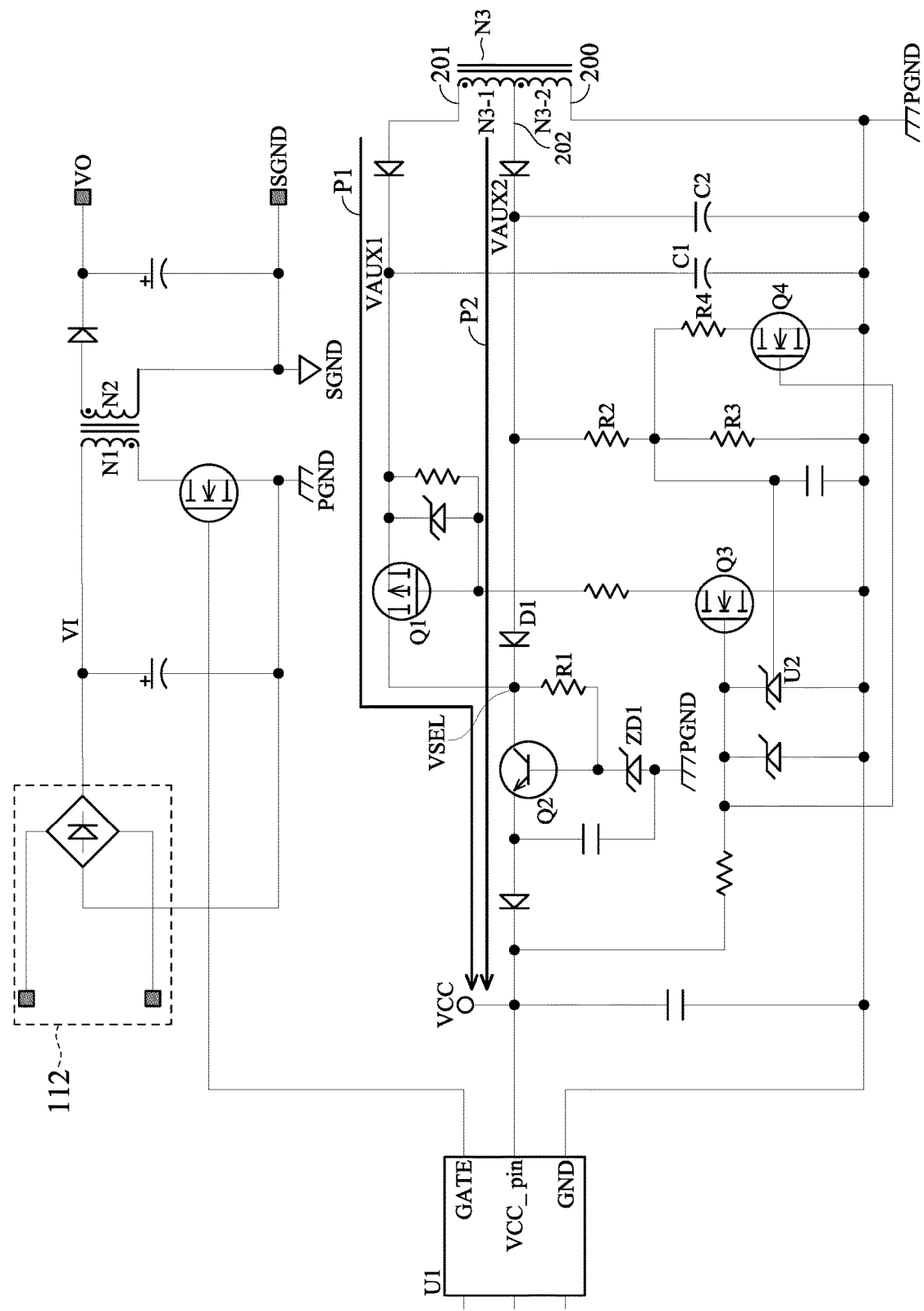
FIG. 4 illustrates a schematic diagram of operation of the power supply system according to the first embodiment of the instant disclosure.

FIG. 4 illustrates a schematic diagram of operation of the power supply system 100 according to the first embodiment of the instant disclosure. Please refer to FIG. 3 and FIG. 4. When the system is first started, the controller U1 has a working voltage VCC, so that the gate and the source of the control switch Q3 is forward biased, and thus a path between a drain (D) and the source of the control switch Q3 is turned on. Because the control switch Q3 is turned on, the switch Q1 is also forward biased and thus turned on. As a result, an initial power supply path is as follows: the voltage is mapped from the secondary side winding N2 to the auxiliary winding N3 (the first sub winding N3-1+the second sub winding N3-2) and then provided for the voltage regulation module 500 through the switch Q1, as shown by the arrow path P1 in FIG. 4. Under this configuration, the selected voltage VSEL received by the voltage regulation module 500 is the first auxiliary voltage VAUX1. In some embodiments, when the system is first started, the working voltage VCC obtained by the power pin VCC_pin of the controller U1 may be obtained by dividing a DC voltage rectified by a bridge rectifier 112 of the primary side circuit 110 until the voltage regulation module 500 is able to stably supply the working voltage VCC required by the controller U1.

When the voltage mapped to the second sub winding N3-2 is less than the lower hysteresis voltage (i.e., the reference voltage×(R2+R3)/R3 in this embodiment), the voltage received by the reference of the voltage regulator U2 is less than the reference voltage internal to the voltage regulator U2. As a result, the voltage regulator U2 is opened, the control switch Q3 is powered by the voltage regulation module 500, and thus the control switch Q3 is forward biased and turned on. Because the control switch Q3 is turned on, the switch Q1 is also forward biased and turned on. Consequently, the power supply path is as follows: the voltage is provided by the auxiliary winding N3 for the voltage regulation module 500 through the switch Q1, as shown by the arrow path P1 in FIG. 4. Under this configuration, the selected voltage VSEL received by the voltage regulation module 500 is also the first auxiliary voltage VAUX1. At the same time, the hysteresis switch Q4 is powered by the voltage regulation module 500 so that the hysteresis switch Q4 is forward biased and turned on, and thus the hysteresis resistor R4 is connected to the bottom resistor R3 in parallel. As a result, the voltage regulator U2 is opened or shorted in response to the result of the comparison between the second auxiliary voltage VAUX2 and the upper hysteresis voltage (i.e., reference voltage×[R2+(R3//R4)]/(R3//R4) in this embodiment). In other words, in this embodiment, when the second auxiliary voltage VAUX2 is greater than the upper hysteresis voltage, the voltage regulator U2 is shorted, and therefore the power supply path P2 shown in FIG. 4 is formed; otherwise, the voltage regulator U2 stays open. When the switch Q1 is turned on, the non-return unit D1 is passively turned off so as to keep the first auxiliary voltage VAUX1 outputted by the first tap 201 from damaging a capacitor C2 connected to the second tap 202 when the switch Q1 is turned on.

When the voltage mapped to the second sub winding N3-2 is greater than the upper hysteresis voltage, the voltage received by the reference of the voltage regulator U2 is greater than the reference voltage internal to the voltage regulator U2. As a result, the voltage regulator U2 is shorted, the control switch Q3 and the hysteresis switch Q4 are both not forward biased and turned off, and thus the switch Q1 is not forward biased and turned off. Consequently, the power supply path is as follows: the voltage is provided by the second sub winding N3-2 for the voltage regulation module 500 through the non-return unit D1, as shown by the arrow path P2 in FIG. 4. Under this configuration, the selected voltage VSEL received by the voltage regulation module 500 is the second auxiliary voltage VAUX2. Because the hysteresis switch Q4 is turned off, the hysteresis resistor R4 is not connected to the bottom resistor R3 in parallel. As a result, the voltage regulator U2 is opened or shorted in response to the result of the comparison between the second auxiliary voltage VAUX2 and the lower hysteresis voltage. In other words, in this embodiment, when the second auxiliary voltage VAUX2 is less than the lower hysteresis voltage, the voltage regulator U2 is opened, and therefore the power supply path P1 shown in FIG. 4 is formed; otherwise, the voltage regulator U2 stays shorted. When the voltage mapped to the second sub winding N3-2 is between the upper hysteresis voltage and the lower hysteresis voltage, the voltage regulator U2 maintains its current state.

Accordingly, the voltage can be provided by a winding having less turns (the second sub winding N3-2 in this embodiment) when the voltage mapped to the second sub winding N3-2 is greater than the upper hysteresis voltage so as to reduce the voltage across the voltage regulation module 500 and thus reduce power consumption and save materials for heat dissipation. Besides, in one or some embodiments of the instant disclosure, the voltage detection unit 440 is connected to the second tap 202 instead of the first tap 201 because of some electrical factors. For example, one of the factors is the relationship between transformer coupling and output load change, wherein the coupling level of the transistor is different under no load and full load conditions; another factor is that, when the voltage mapped to the auxiliary winding travels through different loops, because of different leakage releasing capabilities of the different paths, the voltages on different paths may be different. For example, in an embodiment, the turn ratio of the secondary side winding N2 to the first sub winding N3-1 to the second sub winding N3-2 is N2:N3-1:N3-2=4:10:4. As a result, the coupling of the first sub winding N3-1 plus the second sub winding N3-2 to the secondary side winding N2 is theoretically 3.5 times ((10+4)/4=3.5). However, practical measurement result shows: no load coupling is roughly 3.2 times (65.54/20.38≈3.215), and full load coupling is roughly 3.5 times (72.29/20.61≈3.507). That is, in practical application, different levels of coupling are obtained under no load and full load conditions. Furthermore, when the voltage mapped to the second sub winding N3-2 is less than the lower hysteresis voltage, the selected voltage VSEL received by the voltage regulation module 500 is the first auxiliary voltage VAUX1, the release path of the leakage of the transformer is provided by the auxiliary winding N3 (the first sub winding N3-1+the second sub winding N3-2), and thus spikes in voltage changes are smaller. However, when the voltage mapped to the second sub winding N3-2 is greater than the upper hysteresis voltage, the selected voltage VSEL received by the voltage regulation module 500 is the second auxiliary voltage VAUX2, the leakage of the transformer is only released through the second sub winding N3-2, while the leakage of the first sub winding N3-1 is not provided with a release path, and therefore the first sub winding N3-1 yields higher voltage spikes. When the energy of higher voltage spikes charges a capacitor C1 connected to the first tap 201, the voltage of the capacitor C1 will be higher than the voltage according to the coupling turn ratio. Consequently, if the voltage detection unit 440 is connected to the first tap 201, due to the difference between the transformer couplings under no load and full load and due to different selections of winding paths, larger changes of the voltage that is detected (i.e., the first auxiliary voltage VAUX1 in this scenario) will be obtained. For example, when the output voltage VO at the secondary side circuit 120 changes from 15 V to 20 V, the switch Q1 is switched from on to off. The switching off of the switch Q1 will cause the voltage of the capacitor C1 to be increased. Consequently, when the output voltage VO at the secondary side circuit 120 later changes from 20 V to 15V, the switch Q1 will not be able to switch from off to on. For this issue, in one or some embodiments of the instant disclosure, the voltage detection unit 440 is connected to the second tap 202 so as to avoid large voltage changes and detection point abnormality, and thus the operation of the system can be greatly optimized and stabilized.

Figure 5A:
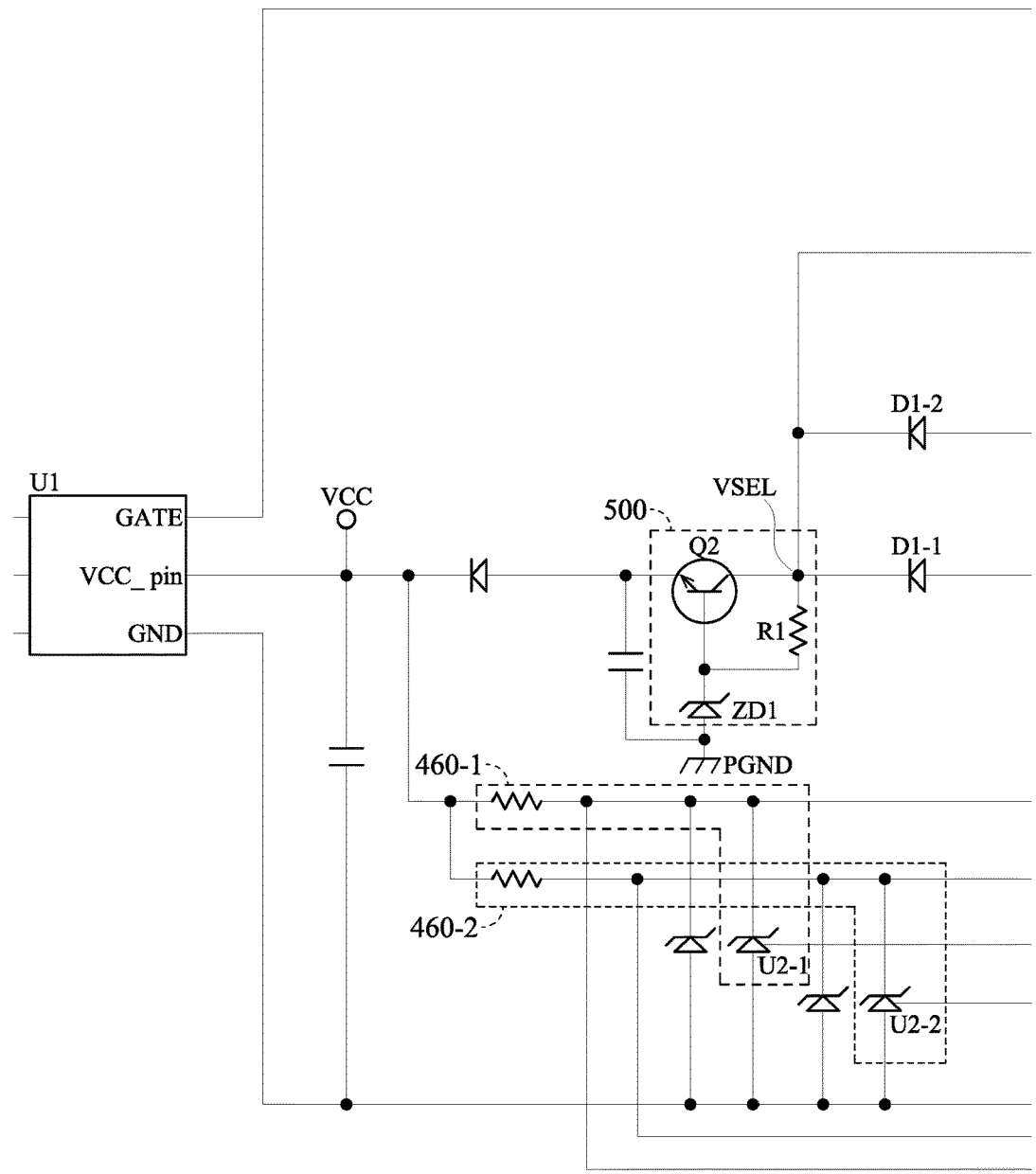
FIG. 5A and FIG. 5B illustrate a schematic circuit diagram of a power supply system according to a second embodiment of the instant disclosure.
Figure 5B:
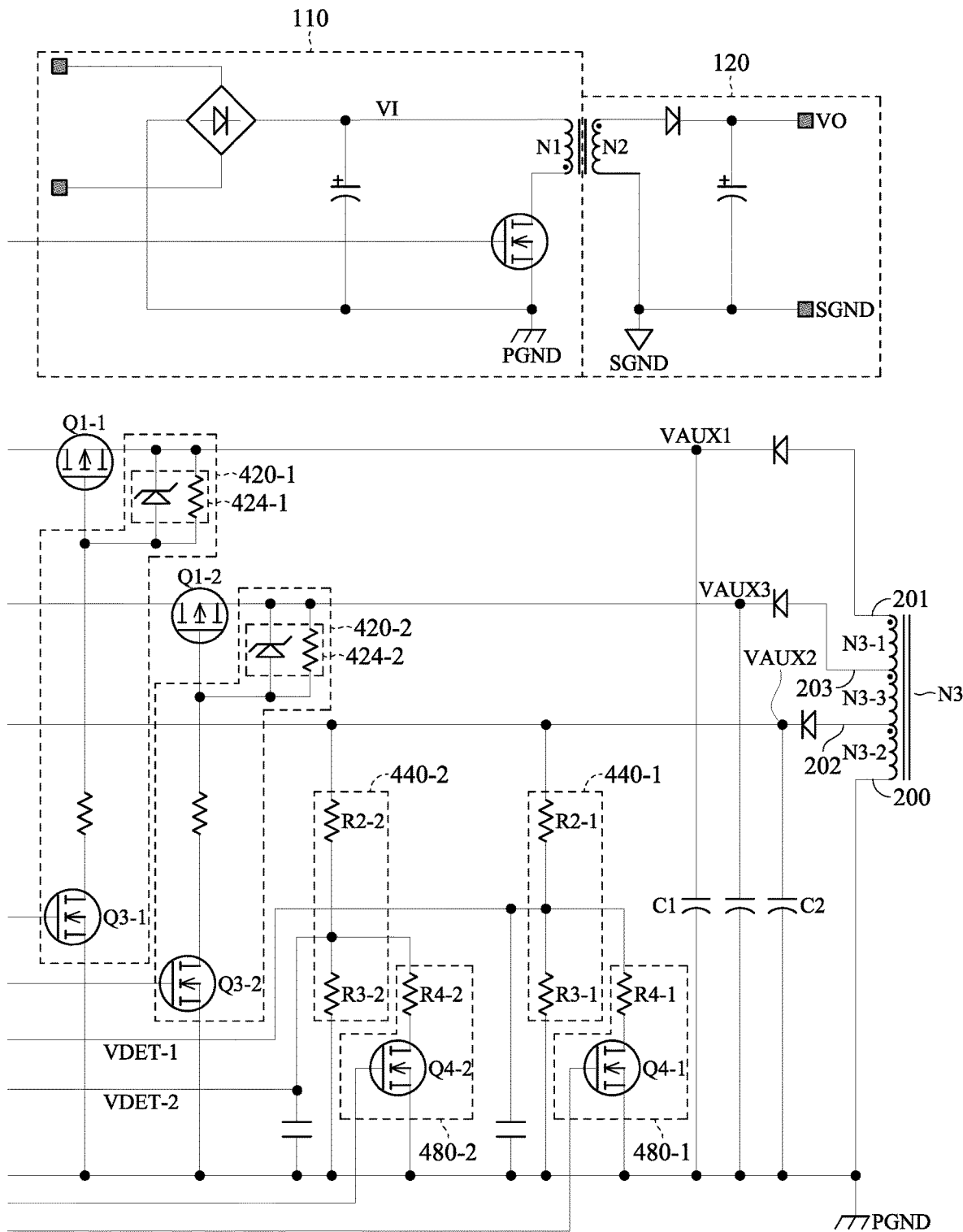

FIG. 5A and FIG. 5B illustrate a schematic circuit diagram of the power supply system 100 according to a second embodiment of the instant disclosure. Please refer to FIG. 5A and FIG. 5B. For simplicity, the following will only illustrate the differences between this embodiment and the previous embodiment. The auxiliary winding N3 further comprises a third sub winding N3-3 and a third tap 203. The third sub winding N3-3 is connected between the first sub winding N3-1 and the second sub winding N3-2 in series. The third tap 203 is provided at the dotted end of the third sub winding N3-3. The secondary side winding N2 maps the output voltage VO to the auxiliary winding N3 so as to allow the third tap 203 to generate a third auxiliary voltage VAUX3. The blocking module 300 is electrically coupled to the third tap 203 to receive the third auxiliary voltage VAUX3. The blocking module 300 outputs one of the first auxiliary voltage VAUX1, the second auxiliary voltage VAUX2, and the third auxiliary voltage VAUX3 as the selected voltage VSEL.

The blocking module 300 comprises a first non-return unit D1-1, a second non-return unit D1-2, a first switch Q1-1, and a second switch Q1-2. The first non-return unit D1-1 is electrically coupled to the second tap 202. The first switch Q1-1 is electrically coupled to the first tap 201. The second switch Q1-2 is electrically coupled between the third tap 203 and the second non-return unit D1-2. When the first switch Q1-1 is turned on, the first non-return unit D1-1 and the second non-return unit D1-2 are turned off passively, and the selected voltage VSEL is the first auxiliary voltage VAUX1. When the first switch Q1-1 is turned off and the second switch Q1-2 is turned on, the first non-return unit D1-1 is turned off passively, and the selected voltage VSEL is the third auxiliary voltage VAUX3. When the first switch Q1-1 and the second switch Q1-2 are turned off, the first non-return unit D1-1 is turned on passively, and the selected voltage VSEL is the second auxiliary voltage VAUX2.

The control module 400 comprises a first path control unit 420-1, a first voltage detection unit 440-1, a first comparison unit 460-1, a second path control unit 420-2, a second voltage detection unit 440-2, a second comparison unit 460-2, a first hysteresis unit 480-1, and a second hysteresis unit 480-2. The first path control unit 420-1 is electrically coupled to the first switch Q1-1. The first voltage detection unit 440-1 is electrically coupled to the second tap 202. The first comparison unit 460-1 is electrically coupled to the first path control unit 420-1 and the first voltage detection unit 440-1. The first voltage detection unit 440-1 receives the second auxiliary voltage VAUX2 to output a first detected voltage VDET-1 to the first comparison unit 460-1. The first comparison unit 460-1 generates a first comparison result according to the first detected voltage VDET-1. The first path control unit 420-1 turns on or turns off the first switch Q1-1 according to the first comparison result. The second path control unit 420-2 is electrically coupled to the second switch Q1-2. The second voltage detection unit 440-2 is electrically coupled to the second tap 202. The second comparison unit 460-2 is electrically coupled to the second path control unit 420-2 and the second voltage detection unit 440-2. The second voltage detection unit 440-2 receives the second auxiliary voltage VAUX2 to output a second detected voltage VDET-2 to the second comparison unit 460-2. The second comparison unit 460-2 generates a second comparison result according to the second detected voltage VDET-2. The second path control unit 420-2 turns on or turns off the second switch Q1-2 according to the second comparison result.

The first voltage detection unit 440-1 comprises a first top resistor R2-1 and a first bottom resistor R3-1. One of two ends of the first top resistor R2-1 and one of two ends of the first bottom resistor R3-1 (i.e., the node between the first top resistor R2-1 and the first bottom resistor R3-1) are coupled to the first comparison unit 460-1. The other end of the first top resistor R2-1 is coupled to the second tap 202 to receive the second auxiliary voltage VAUX2. The other end of the first bottom resistor R3-1 is electrically coupled to the ground electric potential PGND. The second voltage detection unit 440-2 comprises a second top resistor R2-2 and a second bottom resistor R3-2. One of two ends of the second top resistor R2-2 and one of two ends of the second bottom resistor R3-2 (i.e., the node between the second top resistor R2-2 and the second bottom resistor R3-2) are coupled to the second comparison unit 460-2. The other end of the second top resistor R2-2 is coupled to the second tap 202 to receive the second auxiliary voltage VAUX2. The other end of the second bottom resistor R3-2 is electrically coupled to the ground electric potential PGND.

The first hysteresis unit 480-1 is connected to the first bottom resistor R3-1 in parallel. The first hysteresis unit 480-1 comprises a first hysteresis resistor R4-1 and a first hysteresis switch Q4-1. The first hysteresis resistor R4-1 is connected to the first hysteresis switch Q4-1 in series. Consequently, in this embodiment, when the first hysteresis switch Q4-1 is turned on, the first bottom resistor R3-1 and the first hysteresis resistor R4-1 are connected to each other in parallel and thus form a first equivalent resistor, and the first detected voltage VDET-1 is a divided voltage according to the first top resistor R2-1 and the first equivalent resistor. When the first hysteresis switch Q4-1 is turned off, the first detected voltage VDET-1 is a divided voltage according to the first top resistor R2-1 and the first bottom resistor R3-1. Similarly to the first embodiment, the first detected voltage VDET-1 when the first hysteresis switch Q4-1 is turned on is less than the first detected voltage VDET-1 when the first hysteresis switch Q4-1 is turned off. The second hysteresis unit 480-2 is connected to the second bottom resistor R3-2 in parallel. The second hysteresis unit 480-2 comprises a second hysteresis resistor R4-2 and a second hysteresis switch Q4-2. The second hysteresis resistor R4-2 is connected to the second hysteresis switch Q4-2 in series. Consequently, in this embodiment, when the second hysteresis switch Q4-2 is turned on, the second bottom resistor R3-2 and the second hysteresis resistor R4-2 are connected to each other in parallel and thus form a second equivalent resistor, and the second detected voltage VDET-2 is a divided voltage according to the second top resistor R2-2 and the second equivalent resistor. When the second hysteresis switch Q4-2 is turned off, the second detected voltage VDET-2 is a divided voltage according to the second top resistor R2-2 and the second bottom resistor R3-2. Similarly to the first embodiment, the second detected voltage VDET-2 when the second hysteresis switch Q4-2 is turned on is less than the second detected voltage VDET-2 when the second hysteresis switch Q4-2 is turned off.

The first path control unit 420-1 comprises a first control switch Q3-1. The first comparison unit 460-1 comprises a first voltage regulator U2-1. The first control switch Q3-1 is electrically coupled to the control end of the first switch Q1-1. A first end of the first voltage regulator U2-1 is electrically coupled to the first voltage detection unit 440-1 so as to receive the first detected voltage VDET-1, and a second end of the first voltage regulator U2-1 is electrically coupled to the control end of the first control switch Q3-1. In some embodiments, the first voltage regulator U2-1 is also the TL431 voltage regulator integrated circuit adopted in the previous embodiment, but other types of voltage regulators may also be used, and therefore the instant disclosure is not limited thereto. As shown in FIG. 5B, the first path control unit 420-1 further comprises a first regulation element 424-1, and the first regulation element 424-1 is connected between the gate and the source of the first switch Q1-1 so as to regulate the voltage between the gate and the source of the first switch Q1-1. The operation of the first regulation element 424-1 is similar to the operation of the regulation element 424 and thus will not be repeated here. The second path control unit 420-2 comprises a second control switch Q3-2. The second comparison unit 460-2 comprises a second voltage regulator U2-2. The second control switch Q3-2 is electrically coupled to the control end of the second switch Q1-2. A first end of the second voltage regulator U2-2 is electrically coupled to the second voltage detection unit 440-2 so as to receive the second detected voltage VDET-2, and a second end of the second voltage regulator U2-2 is electrically coupled to the control end of the second control switch Q3-2. In some embodiments, the second voltage regulator U2-2 is also the TL431 voltage regulator integrated circuit adopted in the previous embodiment, but other types of voltage regulators may also be used, and therefore the instant disclosure is not limited thereto. As shown in FIG. 5B, the second path control unit 420-2 further comprises a second regulation element 424-2, and the second regulation element 424-2 is connected between the gate and the source of the second switch Q1-2 so as to regulate the voltage between the gate and the source of the second switch Q1-2. The operation of the second regulation element 424-2 is similar to the operation of the regulation element 424 and thus will not be repeated here.

Figure 6A:
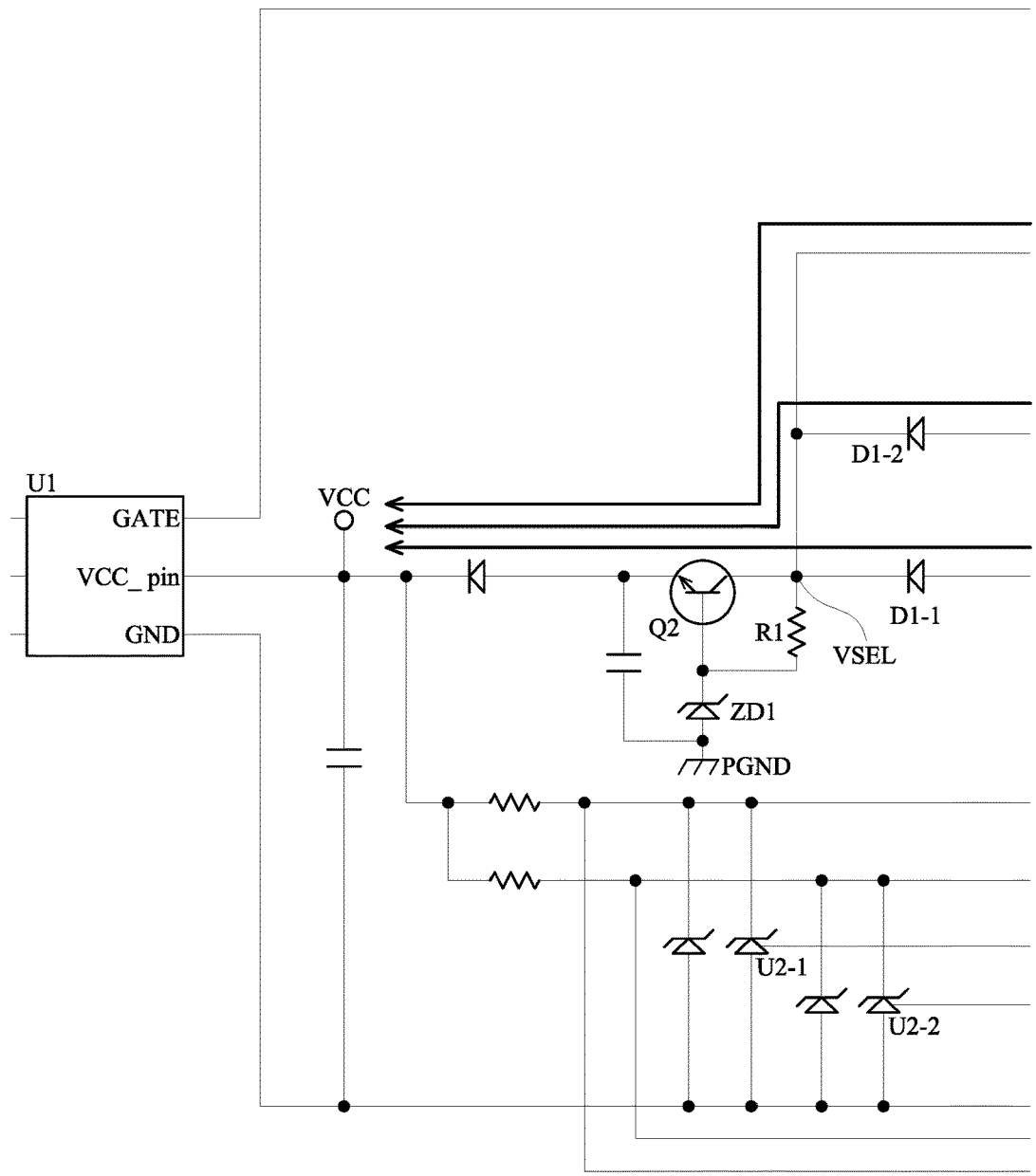
FIG. 6A and FIG. 6B illustrate a schematic diagram of operation of the power supply system according to the second embodiment of the instant disclosure.
Figure 6B:
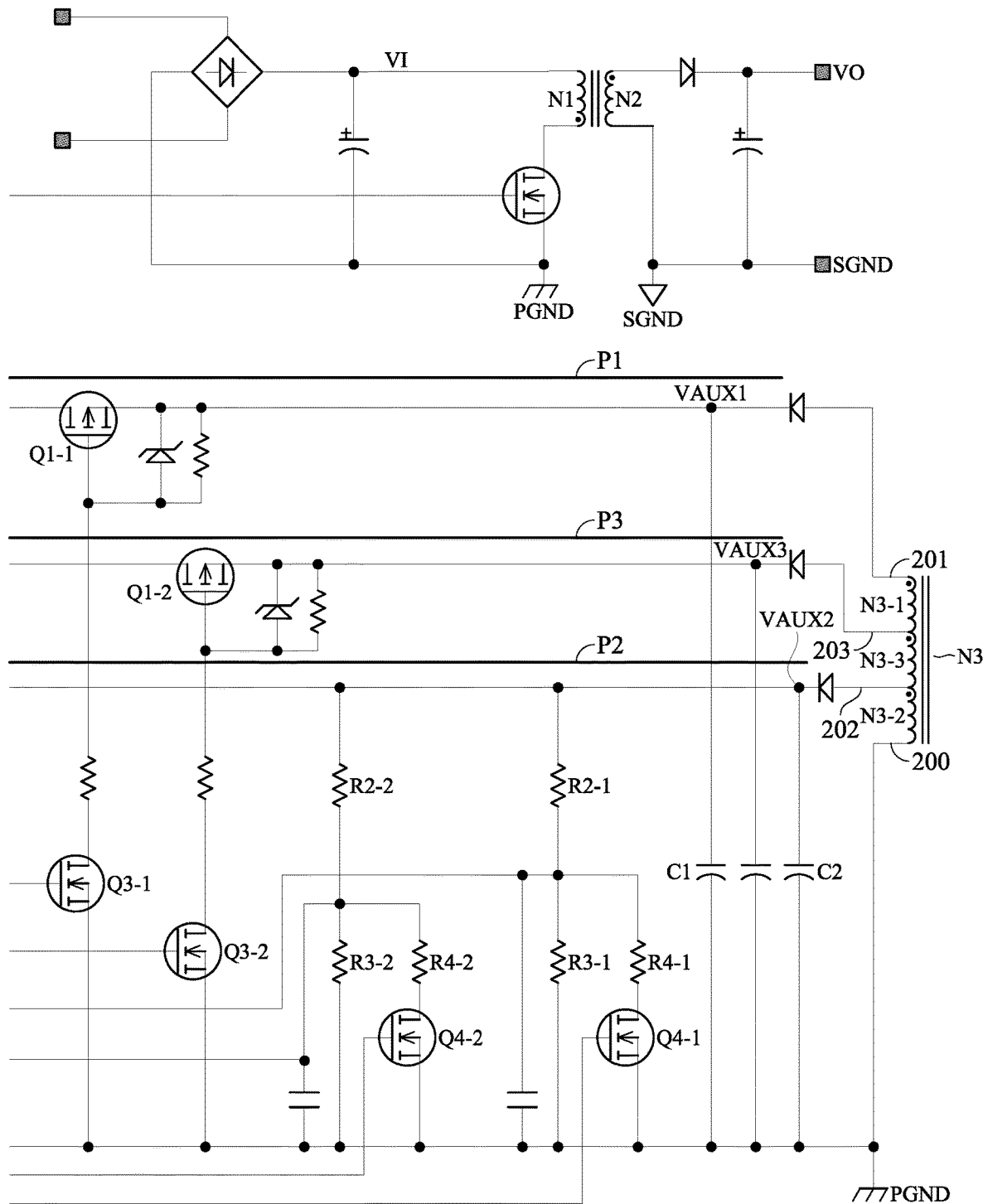

FIG. 6A and FIG. 6B illustrate a schematic diagram of operation of the power supply system 100 according to the second embodiment of the instant disclosure. Please refer to FIG. 5A through FIG. 6B. When the voltage mapped to the second sub winding N3-2 is less than the first lower hysteresis voltage (i.e., the first reference voltage×(R2-1+R3-1)/R3-1 in this embodiment), the voltage received by the reference of the first voltage regulator U2-1 is less than the first reference voltage internal to the first voltage regulator U2-1, and the voltage received by the reference of the second voltage regulator U2-2 is less than the second reference voltage internal to the second voltage regulator U2-2. As a result, the first voltage regulator U2-1 and the second voltage regulator U2-2 are both opened, and therefore the first control switch Q3-1, the first hysteresis switch Q4-1, the second control switch Q3-2 and the second hysteresis switch Q4-2 are all forward biased and thus turned on. As a result, the first switch Q1-1 and the second switch Q1-2 are both also forward biased and turned on.

Under this configuration, the power supply path is as follows: the voltage is mapped from the secondary side winding N2 to the auxiliary winding N3 and then supplied to the controller U1 through the voltage regulation module 500, as shown by the arrow path P1 in FIG. 6A and FIG. 6B. Under this configuration, the selected voltage VSEL received by the voltage regulation module 500 is the first auxiliary voltage VAUX1. Because the first hysteresis switch Q4-1 and the second hysteresis switch Q4-2 are turned on, the first hysteresis resistor R4-1 is connected to the first bottom resistor R3-1 in parallel, and the second hysteresis resistor R4-2 is connected to the second bottom resistor R3-2 in parallel. As a result, the first voltage regulator U2-1 is opened or shorted in response to the result of the comparison between the second auxiliary voltage VAUX2 and the first upper hysteresis voltage (i.e., the first reference voltage×[R2-1+(R3-1//R4-1)]/(R3-1//R4-1) in this embodiment). The operation of the first voltage regulator U2-1 is similar to the operation of the voltage regulator U2 and thus will not be repeated here.

When the voltage mapped to the second sub winding N3-2 is greater than the first upper hysteresis voltage, the voltage received by the reference of the first voltage regulator U2-1 is greater than the first reference voltage internal to the first voltage regulator U2-1. As a result, the first voltage regulator U2-1 is shorted, and therefore the first control switch Q3-1 and the first hysteresis switch Q4-1 are both not forward biased and turned off. Consequently, the first switch Q1-1 is not forward biased and thus turned off. Because the voltage received by the reference of the second voltage regulator U2-2 is less than the second reference voltage internal to the second voltage regulator U2-2, the second voltage regulator U2-2 is opened, and therefore the second control switch Q3-2 and the second hysteresis switch Q4-2 are both forward biased and turned on. As a result, the second switch Q1-2 is forward biased and thus turned on. Consequently, the power supply path is as follows: the voltage is mapped from the secondary side winding N2 to the second sub winding N3-2 and the third sub winding N3-3 and then supplied to the controller U1 through the voltage regulation module 500, as shown by the arrow path P3 in FIG. 6A and FIG. 6B. Under this configuration, the selected voltage VSEL received by the voltage regulation module 500 is the third auxiliary voltage VAUX3.

When the voltage mapped to the second sub winding N3-2 is greater than the second upper hysteresis voltage (i.e., the second reference voltage×[R2-2+(R3-2//R4-2)]/(R3-2//R4-2) in this embodiment), the voltage received by the reference of the second voltage regulator U2-2 is greater than the reference voltage internal to the second voltage regulator U2-2. As a result, the second voltage regulator U2-2 is shorted, the second control switch Q3-2 and the second hysteresis switch Q4-2 are both not forward biased and turned off, and thus the second switch Q1-2 is not forward biased and turned off. Consequently, the power supply path is as follows: the voltage is mapped from the secondary side winding N2 to the second sub winding N3-2 and then supplied to the controller U1 through the voltage regulation module 500, as shown by the arrow path P2 in FIG. 6A and FIG. 6B. Under this configuration, the selected voltage VSEL received by the voltage regulation module 500 is the second auxiliary voltage VAUX2. Because the second hysteresis switch Q4-2 is turned off, the second voltage regulator U2-2 is opened or shorted in response to the result of the comparison between the second auxiliary voltage VAUX2 and the second lower hysteresis voltage (which can for example be set as the second reference voltage×(R2-2+R3-2)/R3-2 in this embodiment). The operation of the second voltage regulator U2-2 is similar to the operation of the voltage regulator U2 of the first embodiment and thus will not be repeated here. The second lower hysteresis voltage is greater than or equal to the first upper hysteresis voltage. When the voltage mapped to the second sub winding N3-2 is between the first upper hysteresis voltage and the first lower hysteresis voltage or between the second upper hysteresis voltage and the second lower hysteresis voltage, the first voltage regulator U2-1 and the second voltage regulator U2-2 maintain their respective current states. Accordingly, according to one or some embodiments of the instant disclosure, appropriate voltage can be provided for the voltage regulation module 500 by the auxiliary winding N3 in response to the wide output voltage (such as 5 V to 48 V) so as to reduce the voltage across the voltage regulation module 500 and thus reduce power consumption and save materials for heat dissipation.

Figure 7:
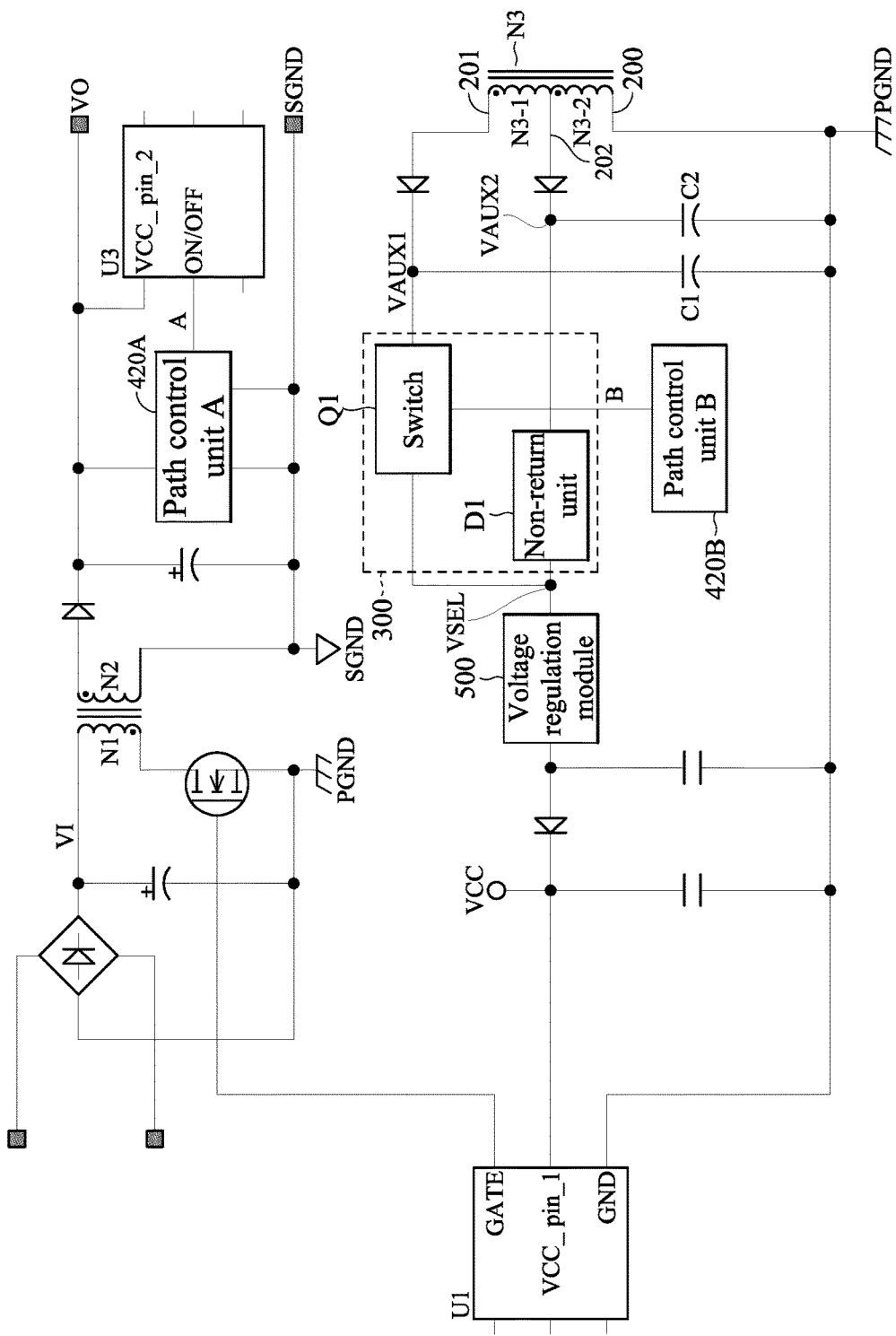
FIG. 7 illustrates a schematic circuit diagram (I) of a power supply system according to a third embodiment of the instant disclosure.

FIG. 7 illustrates a schematic circuit diagram (I) of the power supply system 100 according to a third embodiment of the instant disclosure. Please refer to FIG. 7. The difference between this embodiment and the first embodiment is as follows: the ways for voltage detection and switching of the switch Q1 are different. In detail, the path control unit A 420A and the path control unit B 420 B of the power supply system 100 shown in FIG. 7 together replace the path control unit 420 of the power supply system 100 shown in FIG. 1 through FIG. 3, and an output voltage detection unit U3 of the power supply system 100 shown in FIG. 7 replaces the voltage detection unit 440, the comparison unit 460, and the hysteresis unit 480 of the power supply system 100 shown in FIG. 1 through FIG. 3. A power pin VCC_pin_2 of the output voltage detection unit U3 is connected to the pin of the output voltage VO at the secondary side circuit 120 to directly detect the output voltage VO. Next, the output voltage detection unit U3 outputs a switching signal A according to the output voltage VO through an output pin ON/OFF. The path control unit A 420A is connected to the output voltage detection unit U3, receives the switching signal A, and outputs a wireless switching control signal in a wireless manner according to the switching signal A. The path control unit B 420B is connected to the switch Q1 of the blocking module 300, receives the wireless switching control signal from the path control unit A 420A, and outputs a switching signal B to the switch Q1 according to the wireless switching control signal to control the switching of the switch Q1. In other words, in the embodiment shown in FIG. 7, the voltage detection unit is shifted to and implemented at the secondary side circuit 120, and then the detection result is transmitted in an isolated manner to control the blocking module 300 to output the selected voltage VSEL.

Figure 8:
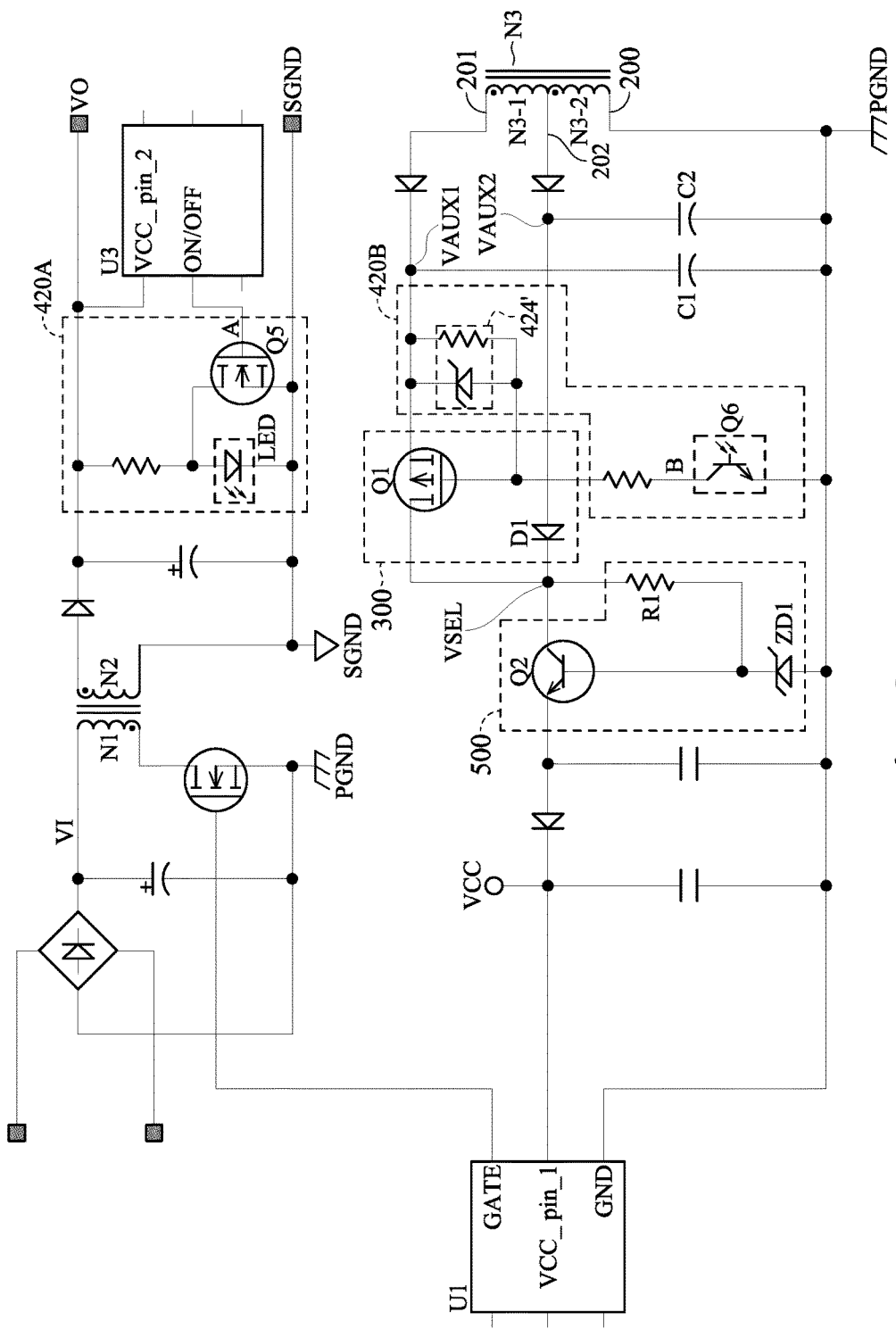
FIG. 8 illustrates a schematic circuit diagram (II) of the power supply system according to the third embodiment of the instant disclosure.

FIG. 8 illustrates a schematic circuit diagram (II) of the power supply system 100 according to the third embodiment of the instant disclosure. Please refer to FIG. 8. In some embodiments, the output voltage detection unit U3 is an integrated circuit. The integrated circuit adopts a single chip (micro control unit) for control, can detect the output voltage VO through analog-digital conversion, and can be installed with programmable comparison functions and hysteresis functions. However, the output voltage detection unit U3 is not limited to being implemented using a single controller or an integrated circuit and therefore may also be another circuit capable of executing similar functions, and the instant disclosure is not limited thereto. In this embodiment, the blocking module 300 and the voltage regulation module 500 are similar to those in the previous embodiments, the function of the controller U1 in this embodiment is the same as that in the first embodiment, and therefore these will not be repeated here.

The path control unit A 420A comprises a control switch A Q5 and a light-emitting diode LED. The control switch A Q5 and the light-emitting diode LED are connected to each other in parallel between the output voltage VO and a secondary side ground electric potential SGND. When the output voltage detection unit U3 outputs the switching signal A to turn off the control switch A Q5, the output voltage VO makes the light-emitting diode LED emit light. When the output voltage detection unit U3 outputs the switching signal A to turn on the control switch A Q5, the output voltage VO travels through the control switch A Q5 and thus the light-emitting diode LED is opened. However, in other embodiments, the element which outputs the wireless switching control signal is not limited to a light-emitting diode, and the element may also be another component capable of executing similar or the same function.

The path control unit B 420B comprises a control switch B Q6. The control switch B Q6 receives the wireless switching control signal from the path control unit A 420A and outputs a switching signal B according to the wireless switching control signal to turn on or turn off the switch Q1. In some embodiments, the control switch B Q6 is a phototransistor adapted to receive the wireless switching control signal from the light-emitting diode LED. However, in other embodiments, the control switch B Q6 is not limited to a phototransistor, as long as the control switch B Q6 can receive the wireless switching control signal from the path control unit A 420A to control the switch Q1. In some embodiments, the path control unit B 420B further comprises a regulation element 424' to regulate the voltage between the gate and the source of the switch Q1.

When the system is first started or when the output voltage VO is less than the lower hysteresis voltage of the output voltage detection unit U3, the output voltage detection unit U3 provides a logic low for the control switch A Q5. As a result, the control switch A Q5 is not forward biased and thus turned off. Consequently, the output voltage VO turns on the light-emitting diode LED and in turn turns on a collector-emitter path of the control switch B Q6, and therefore the switch Q1 is forward biased and thus turned on. Consequently, the power supply path is as follows: the voltage is mapped from the secondary side winding N2 to the auxiliary winding N3 and then supplied to the voltage regulation module 500 through the switch Q1, as shown by the arrow path P1 in FIG. 9. Under this configuration, the selected voltage VSEL received by the voltage regulation module 500 is the first auxiliary voltage VAUX1. Similarly, the non-return unit D1 is passively turned off so as to keep the high voltage outputted by the auxiliary winding N3 from damaging the capacitor C2 connected to the second tap 202 when the drain-source path of the switch Q1 is turned on.

Figure 9:
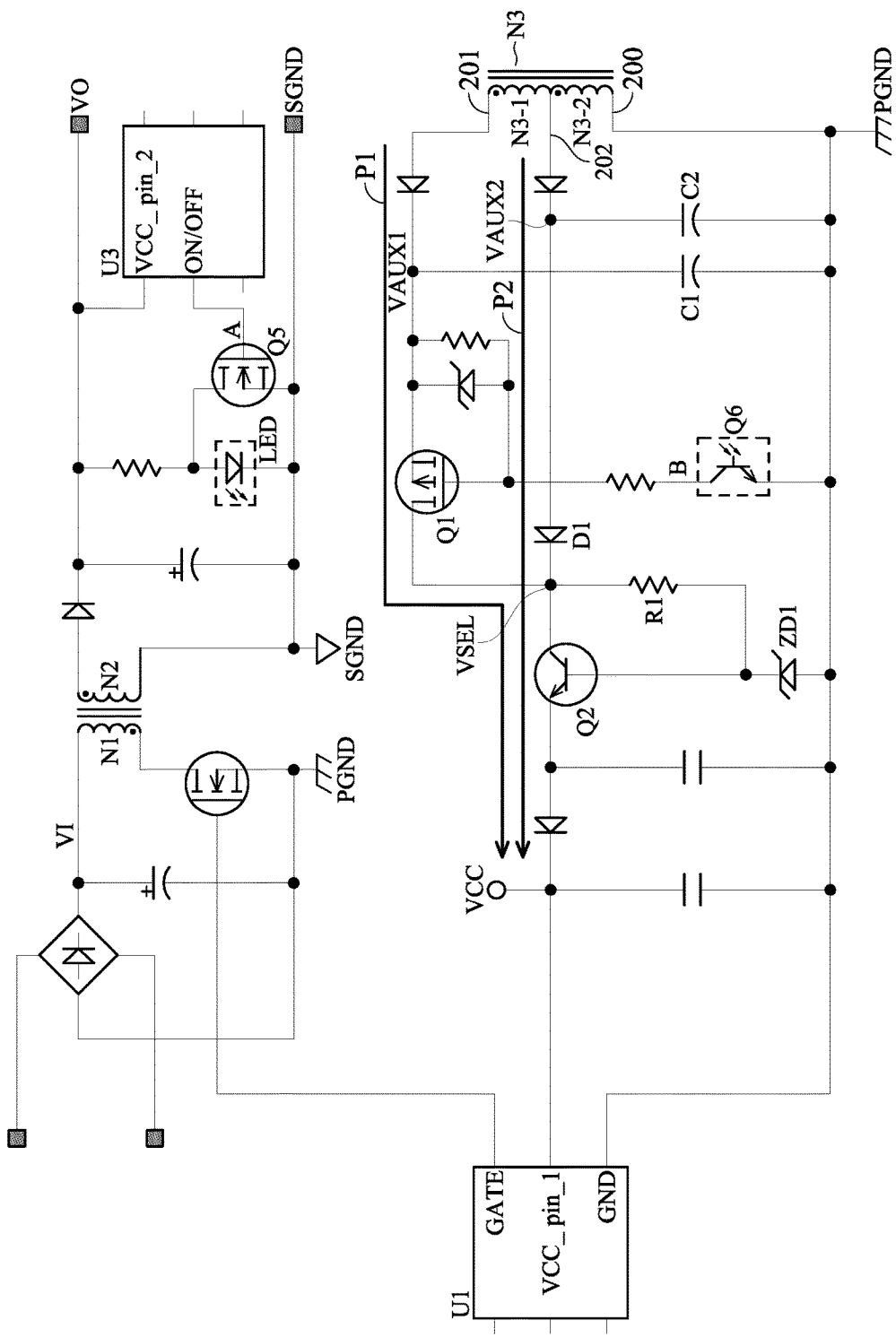
FIG. 9 illustrates a schematic diagram of operation of the power supply system according to the third embodiment of the instant disclosure.

FIG. 9 illustrates a schematic diagram of operation of the power supply system 100 according to the third embodiment of the instant disclosure. Please refer to FIG. 8 and FIG. 9. When the output voltage VO is greater than the upper hysteresis voltage of the output voltage detection unit U3, the output voltage detection unit U3 provides a logic high for the control switch A Q5. As a result, the control switch A Q5 is forward biased and thus turned on. Consequently, the output voltage VO travels through the control switch A Q5 and in turn turns off the light-emitting diode LED, and therefore the switch Q1 is not forward biased and thus turned off. Under this configuration, the power supply path is as follows: the voltage is provided by the second sub winding N3-2 for the voltage regulation module 500 through the non-return unit D1, as shown by the arrow path P2 in FIG. 9. Under this configuration, the selected voltage VSEL received by the voltage regulation module 500 is the second auxiliary voltage VAUX2.

When the output voltage VO is between the lower hysteresis voltage and the upper hysteresis voltage of the output voltage detection unit U3, the output voltage detection unit U3 maintains its current state. Accordingly, the voltage can be provided by a winding having less turns (the second sub winding N3-2) when the output voltage VO is higher so as to reduce the voltage across the voltage regulation module 500 and thus reduce power consumption and save materials for heat dissipation. In this embodiment, the voltage that is detected is the output voltage VO at the secondary side circuit 120. This way of detection is more accurate than detecting the induced voltage at the auxiliary circuit and can reduce the number of components used.

Figure 10:
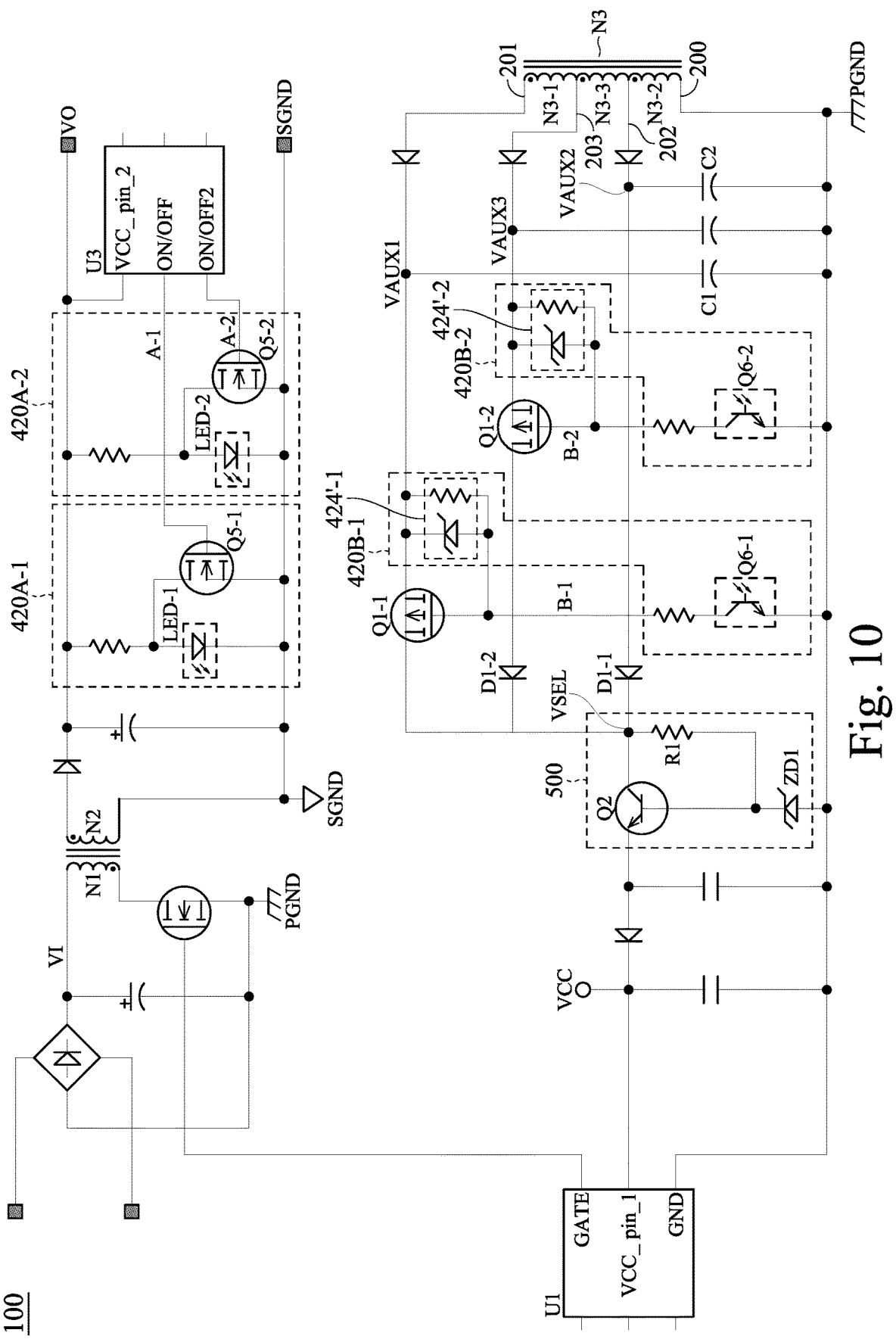
FIG. 10 illustrates a schematic circuit diagram of a power supply system according to a fourth embodiment of the instant disclosure.

FIG. 10 illustrates a schematic circuit diagram of the power supply system 100 according to a fourth embodiment of the instant disclosure. Please refer to FIG. 10. This embodiment may be understood as follows: using the ways for voltage detection and switch control of the third embodiment (as shown in FIG. 7 and FIG. 8) to replace the ways for voltage detection and switch control of the second embodiment (as shown in FIG. 5A through FIG. 6B). That is, the output voltage detection unit U3 of the third embodiment is used to replace the first voltage detection unit 440-1, the second voltage detection unit 440-2, the first comparison unit 460-1, the second comparison unit 460-2, the first hysteresis unit 480-1, and the second hysteresis unit 480-2 of the second embodiment to yield the output voltage detection unit U3 of the fourth embodiment. Besides, two sets of the path control unit A 420A and the path control unit B 420B of the third embodiment are used to replace the first path control unit 420-1 and the second path control unit 420-2 of the second embodiment to yield a first path control unit A 420A-1, a second path control unit A 420A-2, a first path control unit B 420B-1 (which outputs a switching signal B-1 to the first switch Q1-1), and a second path control unit B 420B-2 (which outputs a switching signal B-2 to the second switch Q1-2) of the fourth embodiment. The output pin ON/OFF of the output voltage detection unit U3 is electrically coupled to the first path control unit A 420A-1 and outputs a switching signal A-1. Another output pin ON/OFF2 of the output voltage detection unit U3 is electrically coupled to the second path control unit A 420A-2 and outputs a switching signal A-2. Besides, the first regulation element 424'-1 is substantially identical to the first regulation element 424-1, and the second regulation element 424'-2 is substantially identical to the second regulation element 424-2, and thus the circuit structure and the ways for voltage detection and control is not repeated here.

Figure 11:
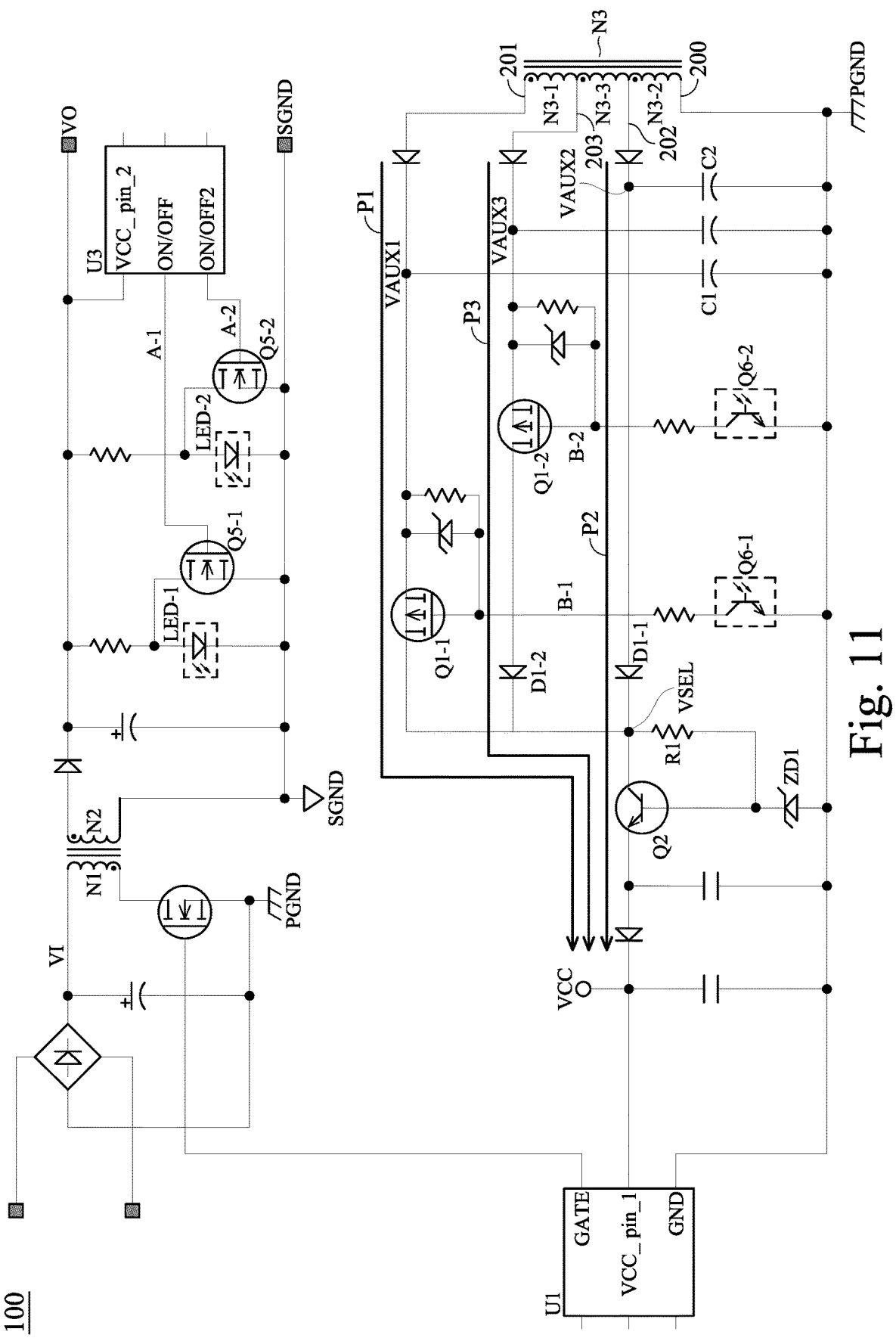
FIG. 11 illustrates a schematic diagram of operation of the power supply system according to the fourth embodiment of the instant disclosure.

FIG. 11 illustrates a schematic diagram of operation of the power supply system 100 according to the fourth embodiment of the instant disclosure. Please refer to FIG. 10 and FIG. 11. When the output voltage VO is less than the first lower hysteresis voltage of the output voltage detection unit U3, the output voltage detection unit U3 provides a logic low for the first control switch A Q5-1. As a result, the first control switch A Q5-1 is not forward biased and thus turned off. Consequently, the output voltage VO turns on the first light-emitting diode LED-1 and in turn turns on the collector-emitter path of the first control switch B Q6-1, and therefore the first switch Q1-1 is forward biased and thus turned on. Under this configuration, the power supply path is as follows: the voltage is mapped from the secondary side winding N2 to the auxiliary winding N3 (the first sub winding N3-1+the second sub winding N3-2+the third sub winding N3-3) and then supplied to the voltage regulation module 500 through the first switch Q1-1, as shown by the arrow path P1 in FIG. 11. Under this configuration, the selected voltage VSEL received by the voltage regulation module 500 is the first auxiliary voltage VAUX1.

When the output voltage VO is greater than the first upper hysteresis voltage of the output voltage detection unit U3, the output voltage detection unit U3 provides a logic high for the first control switch A Q5-1 and provides a logic low for the second control switch A Q5-2. As a result, the first control switch A Q5-1 is forward biased and thus turned on and the second control switch A Q5-2 is not forward biased and thus turned off. Consequently, the output voltage VO turns on the second light-emitting diode LED-2 and in turn turns on the second control switch B Q6-2, and therefore the second switch Q1-2 is forward biased and thus turned on. Under this configuration, the power supply path is as follows: the voltage is mapped from the secondary side winding N2 to the second sub winding N3-2 and the third sub winding N3-3 and then supplied to the voltage regulation module 500 through the second switch Q1-2 and the second non-return unit D1-2, as shown by the arrow path P3 in FIG. 11. Under this configuration, the selected voltage VSEL received by the voltage regulation module 500 is the third auxiliary voltage VAUX3.

When the output voltage VO is greater than the second upper hysteresis voltage of the output voltage detection unit U3, the output voltage detection unit U3 provides logic highs for the first control switch A Q5-1 and the second control switch A Q5-2. As a result, the first control switch A Q5-1 and the second control switch A Q5-2 are both forward biased and thus turned on. Consequently, the output voltage VO cannot turn on the first light-emitting diode LED-1 and the second light-emitting diode LED-2, and therefore the first switch Q1-1 and the second switch Q1-2 are both not forward biased and thus turned off. Under this configuration, the power supply path is as follows: the voltage is mapped from the secondary side winding N2 to the second sub winding N3-2 and then supplied to the voltage regulation module 500 through the first non-return unit D1-1, as shown by the arrow path P2 in FIG. 11. Under this configuration, the selected voltage VSEL received by the voltage regulation module 500 is the second auxiliary voltage VAUX2. When the output voltage VO is between the first upper hysteresis voltage and the first lower hysteresis voltage of the output voltage detection unit U3, or when the output voltage VO is between the second upper hysteresis voltage and the second lower hysteresis voltage of the output voltage detection unit U3, the output voltage detection unit U3 maintains its current state. The second lower hysteresis voltage is greater than or equal to the first upper hysteresis voltage. Accordingly, according to one or some embodiments of the instant disclosure, appropriate voltage can be provided for the voltage regulation module 500 by the auxiliary winding N3 in response to the wide output voltage (such as 5 V to 48 V) so as to reduce the voltage across the voltage regulation module 500 and thus reduce power consumption and save materials for heat dissipation. Moreover, according to one or some embodiments of the instant disclosure, by directly detecting the output voltage VO at the secondary side circuit 120, the accuracy can be higher than detecting the induced voltage at the auxiliary circuit, and thus the number of components used can be reduced.

As above, in the auxiliary circuit according to one or some embodiments of the instant disclosure, the multiple auxiliary coils combined with switches and the detection mechanism can automatically adjust the voltage across the regulator in response to the wide voltage output range and therefore reduce waste heat and energy consumption.

Although the technical context of the instant disclosure has been disclosed with the preferred embodiments above, the embodiments are not meant to limit the instant disclosure. Any adjustment and retouch done by any person skill in the art without deviating from the spirit of the instant disclosure shall be covered by the scope of the instant disclosure. Therefore, the protected scope of the instant disclosure shall be defined by the attached claims.

What is claimed is:

1. A power supply system, comprising:
a primary side circuit comprising a primary side winding;
a secondary side circuit comprising a secondary side winding, wherein the primary side winding and the secondary side winding are magnetically coupled to each other, and the secondary side winding outputs an output voltage;
an auxiliary winding magnetically coupled to the secondary side winding, wherein the auxiliary winding comprises a first sub winding and a second sub winding which are connected to each other in series, and the auxiliary winding has a first tap, a second tap, and a ground tap; the first tap is provided at a dotted end of the first sub winding, the second tap is provided at a dotted end of the second sub winding, and the ground tap electrically couples a non-dotted end of the second sub winding to a ground electric potential; the secondary side winding maps the output voltage to the auxiliary winding so as to allow the first tap to generate a first auxiliary voltage and the second tap to generate a second auxiliary voltage;
a blocking module electrically coupled to the first tap through a first diode and coupled to the second tap through a second diode, wherein the blocking module receives the first auxiliary voltage and the second auxiliary voltage, and the blocking module outputs one of the first auxiliary voltage and the second auxiliary voltage as a selected voltage;
a control module electrically coupled to the second tap through the second diode and coupled to the blocking module, wherein the control module receives the second auxiliary voltage, and the control module controls the blocking module to output the first auxiliary voltage or the second auxiliary voltage as the selected voltage according to an amplitude of the second auxiliary voltage; and
a controller electrically coupled to the blocking module and the control module; wherein
the blocking module comprises a switch electrically coupled to the first tap; and
the control module comprises:
a path control unit electrically coupled to the switch;
a voltage detection unit electrically coupled to the second tap, wherein the voltage detection unit receives the second auxiliary voltage to output a detected voltage; and
a comparison unit electrically coupled to the path control unit and the voltage detection unit, wherein the comparison unit generates a comparison result according to the detected voltage, and the path control unit turns on or turns off the switch according to the comparison result.

2. The power supply system according to claim 1, wherein the blocking module comprises a non-return unit, electrically coupled to the second tap.

3. The power supply system according to claim 2, wherein when the switch is turned on, the blocking module outputs the first auxiliary voltage as the selected voltage; when the switch is turned off, the blocking module outputs the second auxiliary voltage as the selected voltage.

4. The power supply system according to claim 3, wherein the voltage detection unit comprises a top resistor and a bottom resistor, one of two ends of the top resistor and one of two ends of the bottom resistor are coupled to the comparison unit, the other end of the top resistor is electrically coupled to the second tap to receive the second auxiliary voltage, the other end of the bottom resistor is electrically coupled to the ground electric potential, and the detected voltage is a divided voltage according to the top resistor and the bottom resistor.

5. The power supply system according to claim 4, wherein the control module comprises a hysteresis unit, the hysteresis unit is connected to the bottom resistor in parallel, the hysteresis unit comprises a hysteresis resistor and a hysteresis switch, and the hysteresis resistor is connected to the hysteresis switch in series; when the hysteresis switch is turned on, the bottom resistor and the hysteresis resistor are connected to each other in parallel and thus form an equivalent resistor, and the detected voltage is a divided voltage according to the top resistor and the equivalent resistor; when the hysteresis switch is turned off, the detected voltage is the divided voltage according to the top resistor and the bottom resistor.

6. The power supply system according to claim 3, wherein the path control unit comprises a control switch electrically coupled to a control end of the switch.

7. The power supply system according to claim 6, wherein the comparison unit comprises a voltage regulator, a first end of the voltage regulator is electrically coupled to the voltage detection unit so as to receive the detected voltage, and a second end of the voltage regulator is electrically coupled to a control end of the control switch.

8. The power supply system according to claim 1, further comprising a voltage regulation module electrically coupled between the blocking module and the controller, wherein the voltage regulation module is adapted to regulate the selected voltage so as to generate a regulated voltage for the controller.

9. The power supply system according to claim 8, wherein the voltage regulation module comprises a regulation switch, a regulation element, and a regulation resistor; the regulation switch is coupled to the regulation element in series, the regulation switch is coupled to the regulation resistor in parallel, one of two ends of the regulation resistor is coupled to the blocking module, the other end of the regulation resistor is coupled to the regulation element and a control end of the regulation switch, and the regulation element receives the selected voltage through the regulation resistor to provide a stable voltage.

10. The power supply system according to claim 1, wherein:
the auxiliary winding further comprises a third sub winding and a third tap, the third sub winding is connected between the first sub winding and the second sub winding in series, the third tap is provided at a dotted end of the third sub winding, and the secondary side winding maps the output voltage to the auxiliary winding so as to allow the third tap to generate a third auxiliary voltage; and
the blocking module is electrically coupled to the third tap to receive the third auxiliary voltage, and the blocking module outputs one of the first auxiliary voltage, the second auxiliary voltage, and the third auxiliary voltage as the selected voltage.

11. The power supply system according to claim 10, wherein the blocking module comprises:
a first non-return unit electrically coupled to the second tap;
a second non-return unit;
a first switch electrically coupled to the first tap; and
a second switch electrically coupled between the third tap and the second non-return unit;
wherein, when the first switch is turned on, the first non-return unit and the second non-return unit are turned off passively, and the selected voltage is the first auxiliary voltage; when the first switch is turned off and the second switch is turned on, the first non-return unit is turned off passively, and the selected voltage is the third auxiliary voltage; when the first switch and the second switch are turned off, the first non-return unit is turned on passively, and the selected voltage is the second auxiliary voltage.

12. The power supply system according to claim 11, wherein the control module comprises:
a first path control unit electrically coupled to the first switch;
a first voltage detection unit electrically coupled to the second tap, wherein the first voltage detection unit receives the second auxiliary voltage to output a first detected voltage;
a first comparison unit electrically coupled to the first path control unit and the first voltage detection unit;
a second path control unit electrically coupled to the second switch;
a second voltage detection unit electrically coupled to the second tap, wherein the second voltage detection unit receives the second auxiliary voltage to output a second detected voltage; and
a second comparison unit electrically coupled to the second path control unit and the second voltage detection unit;
wherein the first comparison unit receives the first detected voltage to generate a first comparison result according to the first detected voltage; the first path control unit turns on or turns off the first switch according to the first comparison result; the second comparison unit receives the second detected voltage to generate a second comparison result according to the second detected voltage; the second path control unit turns on or turns off the second switch according to the second comparison result.

13. The power supply system according to claim 12, wherein the first voltage detection unit comprises a first top resistor and a first bottom resistor, one of two ends of the first top resistor and one of two ends of the first bottom resistor are coupled to the first comparison unit, the other end of the first top resistor is coupled to the second tap to receive the second auxiliary voltage, the other end of the first bottom resistor is electrically coupled to the ground electric potential, and the first detected voltage is a divided voltage according to the first top resistor and the first bottom resistor; the second voltage detection unit comprises a second top resistor and a second bottom resistor, one of two ends of the second top resistor and one of two ends of the second bottom resistor are coupled to the second comparison unit, the other end of the second top resistor is coupled to the second tap to receive the second auxiliary voltage, the other end of the second bottom resistor is electrically coupled to the ground electric potential, and the second detected voltage is a divided voltage according to the second top resistor and the second bottom resistor.

14. The power supply system according to claim 13, wherein the control module comprises:
a first hysteresis unit connected to the first bottom resistor in parallel, wherein the first hysteresis unit comprises:
a first hysteresis resistor and a first hysteresis switch, wherein:
the first hysteresis resistor is connected to the first hysteresis switch in series; when the first hysteresis switch is turned on, the first bottom resistor and the first hysteresis resistor are connected to each other in parallel and thus form a first equivalent resistor, and the first detected voltage is a divided voltage according to the first top resistor and the first equivalent resistor; when the first hysteresis switch is turned off, the first detected voltage is the divided voltage according to the first top resistor and the first bottom resistor; and
a second hysteresis unit connected to the second bottom resistor in parallel, wherein the second hysteresis unit comprises:
a second hysteresis resistor and a second hysteresis switch, wherein:
the second hysteresis resistor is connected to the second hysteresis switch in series; when the second hysteresis switch is turned on, the second bottom resistor and the second hysteresis resistor are connected to each other in parallel and thus form a second equivalent resistor, and the second detected voltage is a divided voltage according to the second top resistor and the second equivalent resistor; when the second hysteresis switch is turned off, the second detected voltage is the divided voltage according to the second top resistor and the second bottom resistor.

15. The power supply system according to claim 12, wherein the first path control unit comprises a first control switch electrically coupled to a control end of the first switch.

16. The power supply system according to claim 15, wherein the first comparison unit comprises a first voltage regulator, a first end of the first voltage regulator is electrically coupled to the first voltage detection unit so as to receive the first detected voltage, and a second end of the first voltage regulator is electrically coupled to a control end of the first control switch.

17. The power supply system according to claim 12, wherein the second path control unit comprises a second control switch electrically coupled to a control end of the second switch.

18. The power supply system according to claim 17, wherein the second comparison unit comprises a second voltage regulator, a first end of the second voltage regulator is electrically coupled to the second voltage detection unit so as to receive the second detected voltage, and a second end of the second voltage regulator is electrically coupled to a control end of the second control switch.

19. The power supply system according to claim 10, further comprising a voltage regulation module electrically coupled between the blocking module and the controller, wherein the voltage regulation module is adapted to regulate the selected voltage so as to generate a regulated voltage for the controller.

20. The power supply system according to claim 19, wherein the voltage regulation module comprises a regulation switch, a regulation element, and a regulation resistor; the regulation switch is coupled to the regulation element in series, the regulation switch is coupled to the regulation resistor in parallel, one of two ends of the regulation resistor is coupled to the blocking module, the other end of the regulation resistor is coupled to the regulation element and a control end of the regulation switch, and the regulation element receives the selected voltage through the regulation resistor to provide a stable voltage.

* * * * *